(12) United States Patent
Iwasaki et al.

(10) Patent No.: US 6,323,385 B1
(45) Date of Patent: Nov. 27, 2001

(54) WET TYPE METHOD OF RENDERING DIOXINS INNOXIOUS

(75) Inventors: Mamoru Iwasaki, Yokohama; Ryuichi Kanai, Kawasaki; Kazushige Kawamura; Hideki Sugiyama, both of Yokohama; Osamu Togari, Tokyo; Sachio Asaoka, Yokohama; Minoru Uchida, Tokyo; Dai Takeda, Yokohama, all of (JP)

(73) Assignee: Chiyoda Corporation (JP)

( * ) Notice: Subject to any disclaimer, the term of this patent is extended or adjusted under 35 U.S.C. 154(b) by 0 days.

(21) Appl. No.: 09/581,899

(22) PCT Filed: Dec. 25, 1998

(86) PCT No.: PCT/JP98/05978

§ 371 Date: Jun. 20, 2000

§ 102(e) Date: Jun. 20, 2000

(87) PCT Pub. No.: WO99/33525

PCT Pub. Date: Jul. 8, 1999

(30) Foreign Application Priority Data

Dec. 25, 1997 (JP) .................................................. 9-356696
Oct. 5, 1998 (JP) ................................................ 10-282542

(51) Int. Cl.⁷ ...................................................... A62D 3/00

(52) U.S. Cl. ............................ 588/209; 588/207; 588/205
(58) Field of Search ..................................... 588/205, 209, 588/207

(56) References Cited

U.S. PATENT DOCUMENTS

| | | | | |
|---|---|---|---|---|
| 5,777,192 | * | 7/1998 | Sako et al. | 588/208 |
| 6,063,979 | * | 5/2000 | Miyata et al. | 588/205 |
| 6,072,099 | * | 6/2000 | Tanaka et al. | 588/205 |
| 6,077,431 | * | 6/2000 | Kawanishi et al. | 210/609 |
| 6,124,519 | * | 9/2000 | Sako et al. | 588/205 |

FOREIGN PATENT DOCUMENTS

| | | |
|---|---|---|
| 6-114122 | 4/1994 | (JP) . |
| 8-1131 | 1/1996 | (JP) . |
| 10-151430 | 6/1998 | (JP) . |

* cited by examiner

*Primary Examiner*—Deborah C. Lambkin
(74) *Attorney, Agent, or Firm*—Lorusso & Loud

(57) ABSTRACT

A process for the wet processing of a dioxin-containing material, wherein the material is contacted with an aqueous solution, acidified with hydrochloric acid and containing a catalyst dissolved therein, at a temperature lower than 100° C. to decompose the dioxins into harmless substances with a decomposition rate of at least 60%.

11 Claims, 13 Drawing Sheets

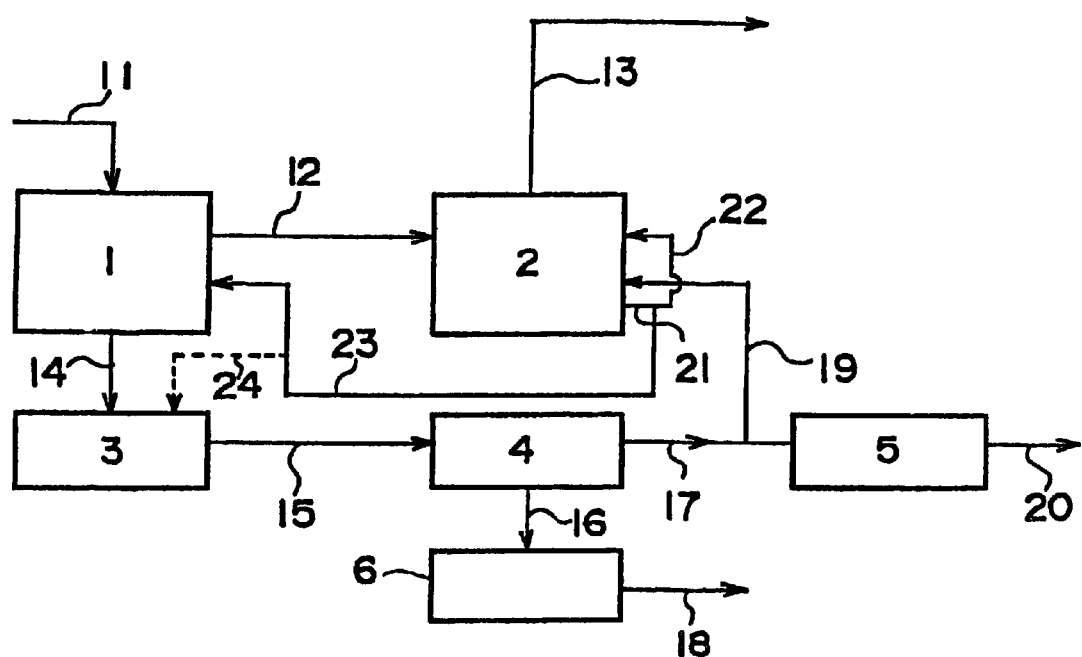
F I G. 9

WET TYPE METHOD OF RENDERING DIOXINS INNOXIOUS

This application is a 371 of PCT/JP98/05978 Dec. 25, 1998.

TECHNICAL FIELD

The present invention relates to a process for the wet decomposition of dioxins into harmless substances and to a process for the wet processing of a fly ash-containing gas discharged from a combustion furnace into a harmless substance.

BACKGROUND ART

Dioxins, the typical example of which is 2,3,7,8-tetrachlorodibenzo-p-dioxin (2,3,7,8-TCDD), are extremely harmful to human bodies and the discharge thereof to an atmosphere is strongly prohibited. Ministry of Health and Welfare of Japan published "Guideline for Prevention of Generation of Dioxins in Waste Treatment" in January, 1997, in which the concentration of dioxins in flue gases discharged from any newly constructed furnace is instructed to be suppressed to 0.1 ng-TEQ/Nm$^3$ or less. Environment Agency of Japan designates dioxins as being harmful substances by an amendment of the Atmospheric Pollution Prevention Law of December, 1997 and defines a regulating value for dioxins generated by combustion of industrial wastes as well as municipal solid wastes.

Various methods have been hitherto proposed for decomposing dioxins into harmless substances. Examples of these methods include a combustion method, a melting method, a thermal decomposition method, a photo-decomposition method, an ozone decomposition method, an oxidation decomposition method using hydrogen peroxide, a hydrothermal decomposition method and an alkali decomposition method.

The conventional methods, however, involve problems, because they encounter great difficulties in practicing and because they are not satisfactory from the standpoint of economy.

JP-A-H10-146574 proposes a method of decomposing dioxins, wherein a dioxin-containing fly ash is mixed with an oxidative acid such as sulfuric acid to form a slurry which is then heated at a temperature higher than 100° C.

With the above method, dioxins are efficiently converted into harmless substances. However, the method has problems that energy consumption is large and high apparatus costs are required, because the treatment is performed at a temperature of at least 100° C. which is above the boiling point of water (at atmospheric pressure, and so forth), preferably at least 200° C., while evaporating water.

It is the prime object of the present invention to provide a process for the wet decomposition of dioxins into harmless substances, which process is performed at a temperature lower than the boiling point of water and which can convert dioxins into harmless substances at a low cost.

Another object of the present invention is to provide a process for the wet processing of a flue gas from a combustion furnace containing dioxin-containing fly ash, which process is performed at a temperature lower than the boiling point of water and which can convert dioxins into harmless substances at a low cost.

The present inventors have made an intensive study for accomplishing the above objects and unexpectedly found that dioxins can be converted into harmless substances when contacted at a temperature lower than 100° C. with an aqueous solution acidified with hydrochloric acid and containing a catalyst dissolved therein and have completed the present invention.

In accordance with the present invention, there is provided a process for the wet decomposition of dioxins into harmless substances, characterized in that the dioxins are contacted with an aqueous solution, acidified with hydrochloric acid and containing a catalyst dissolved therein, at a temperature lower than 100° C. to decompose the dioxins into harmless substances with a decomposition rate of at least 60%.

The present invention also provides a process for the wet processing of a flue gas from a combustion furnace containing a dioxin-containing fly ash into a harmless substance, characterized in that said flue gas is contacted with an aqueous solution, acidified with hydrochloric acid and containing a catalyst dissolved therein, at a temperature lower than 100° C. to cause the fly ash contained in said flue gas to migrate into said aqueous solution and to decompose the dioxins deposited on the fly ash into a harmless substance with a decomposition rate of at least 60%.

The present invention further provides a process for the wet processing of a flue gas generated from a combustion furnace, having a temperature higher than 100° C. and containing a dioxin-containing fly ash into a harmless substance, characterized in that said process comprises (i) a cooling step of bringing the flue gas with gas-liquid contact with a cooling liquid to reduce the temperature of the flue gas to below 100° C., (ii) a gas-liquid contacting step of bringing said flue gas obtained in said cooling step into gas-liquid contact with an aqueous solution acidified with hydrochloric acid, and (iii) a dioxin decomposing step of subjecting the fly ash-containing cooling liquid "A" obtained in said cooling step and the fly ash-containing aqueous solution "B" obtained in said contacting step, separately or jointly, to treatment conditions including a chlorine ion concentration of at least 10 mmol/liter, a copper ion concentration of at least 20 mg/liter and a treatment temperature of lower than 100° C. to decompose the dioxins contained in the fly ash into harmless substances.

The present invention further provides a process for the wet processing of a flue gas generated from a combustion furnace and containing a dioxin-containing fly ash into a harmless substance, characterized in that said process comprises (i) a gas-liquid contacting step of bringing said flue gas cooled to a temperature lower than 100° C. into gas-liquid contact with an aqueous solution acidified with hydrochloric acid, (ii) a fly ash concentrating step of increasing a fly ash content of the aqueous solution obtained in said gas-liquid contacting step and containing fly ash, and (iii) a dioxin decomposing step of maintaining said aqueous solution, obtained in said fly ash concentrating step and containing an increased amount of the fly ash, at a temperature lower than 100° C. in the presence of a catalyst in a dissolved state, thereby decomposing the dioxins contained in the fly ash into harmless substances.

The present invention further provides a process for the wet processing of a flue gas generated from a combustion furnace and containing a dioxin-containing fly ash into a harmless substance, characterized in that said process comprises (i) a first gas-liquid contacting step of bringing said flue gas with a first treating liquid, (ii) a second gas-liquid contacting step of bringing the treated flue gas obtained in said first gas-liquid contacting step with a second treating liquid, and (iii) a dioxin decomposing step of contacting fly ash "A" captured by said first treating liquid in said first gas-liquid contacting step and fly ash "B" captured by said second treating liquid in said second gas-liquid contacting step, separately or jointly, into contact with an aqueous solution, acidified with hydrochloric acid and containing a catalyst dissolved therein, to decompose the dioxins contained in the fly ash into harmless substances.

The term "dioxins" used in the present specification is intended to refer to 2,3,7,8-tetrachlorodibenzo-p-dioxin (2,3,7,8-TCDD) and similar compounds thereof and to include polychlorodibenzo-p-dioxins (PCDDs) having 1–8 chlorine atoms in the dibenzo-p-dioxin structure and polychlorodibenzofurans (PCDFs) having 1–8 chlorine atoms in the dibenzofuran nucleus.

As described above, dioxins include various chlorinated compounds. Since the toxicity of dioxins varies with the kind thereof, it is necessary to establish a standard based on which toxicity of individual dioxins can be evaluated in order to evaluate a mixture of dioxins as a whole. For this reason, a factor (toxicity equivalent factor (TEF)) for calculating an amount of a dioxin in terms of an amount of 2,3,7,8-TCDD providing the same toxicity as that of the dioxin has been determined on the basis of short time toxicity evaluation of respective dioxins. By multiplying amounts of respective dioxins by the toxicity equivalent factor, toxicity equivalent quantities (TEQ) thereof can be obtained. The toxicity equivalent quantity is used for indicating a discharge amount and a concentration of dioxins.

The process for the treatment of dioxins into harmless substances according to the present invention is characterized in that the dioxins are contacted with an aqueous solution acidified with hydrochloric acid and containing a catalyst dissolved therein (hereinafter referred to simply as reaction treatment agent or aqueous solution). The treatment temperature is lower than the boiling point of water (100° C.), preferably 80° C. or less. The lower limit is about 30° C.

The aqueous solution which is used as a reaction treating agent in the present invention has a $Cl^-$ ion concentration of at least 10 mmol (millimol), preferably at least 100 mmol, per liter of the aqueous solution. The upper limit is about 3,000 mmol. The pH of the aqueous solution is 7 or less, preferably 6 or less, with a lower limit being generally about 2. The aqueous solution can contain other inorganic acids such as sulfuric acid. In this case, it is advisable that the molar ratio $[Cl^-]/[SO_4^{2-}]$ of the $Cl^-$ to the $SO_4^{2-}$ ion be 5 or more, preferably 20 or more. An upper limit is not specifically defined. As a method of contacting dioxins with the aqueous solution, there may be mentioned a method in which dioxins or dioxin-containing solids are stirred in the aqueous solution, a method in which the aqueous solution is sprayed for contacting with dioxins or dioxin-containing solids, and a method in which contact is performed in a packed column or a plate column.

The term "aqueous solution acidified with hydrochloric acid" used in the present specification is intended to mean an aqueous acidic solution containing chlorine ion. Examples of the acids used for maintaining the acidity may include hydrochloric acid, sulfuric acid and nitric acid. The use of hydrochloric acid is preferred.

The term "decomposition of dioxins" used herein is intended to refer to conversion of dioxins into detoxified compounds.

The aqueous solution acidified with hydrochloric acid used as the reaction treatment agent in the present invention contains a catalyst which serves to promote the decomposition of dioxins. The inventors' studies have revealed that the contact of dioxins with the aqueous solution can convert dioxins into harmless substances. When, however, the aqueous solution does not contain the catalyst, it takes a long time to convert dioxins into harmless substances. Thus, from the industrial and commercial point of view, it is important that the catalyst should be present in the aqueous solution. As the catalyst, a metal ion is used. The metal of such a metal ion may be, for example, iron, manganese, copper, nickel, cobalt, molybdenum, chromium, vanadium, tungsten, silver and tin. The above metal ions may be used by themselves or as a mixture of two or more thereof. The metal ion may be an ordinary metal ion or a complex ion. The use of a copper ion or an iron ion is found to be preferred as a result of the inventors' studies. The amount of the metal ion contained in the aqueous solution is not specifically limited. In the case of copper ion, the amount is 20–10,000 mg/liter, preferably 100–5,000 mg/liter, in terms of elemental copper. No increase of the effect of the addition is expected even when the amount exceeds 10,000 mg/liter. In the case of other metal ions, the amount thereof is similar to that of the copper ion.

The catalyst used in the present invention is generally in the form of a metal oxide or a metal salt, such as a chloride, an oxide, a carbonate or a sulfate. The aqueous solution acidified with hydrochloric acid and used as the reaction treatment agent for rendering dioxins harmless contains such a metal oxide or metal salt in a dissolved state. In this case, however, the catalyst can contain an undissolved matter which is generally in the course of being converted into a dissolved state. A catalyst containing such an undissolved matter in the course of being converted into a dissolved state can be effectively used.

As the catalyst used in the present invention, metal components contained in a combustion ashes such as a fly ash or a bottom ash may be utilized. Combustion ashes often contain metal components which can function as the above-described catalyst. By stirring such a combustion ash in an aqueous solution acidified with hydrochloric acid, the metal components contained therein can be utilized as the catalyst. Namely, the metal contained in the combustion ash is dissolved in the aqueous solution to form a metal ion when the combustion ash is contacted with the aqueous solution acidified with hydrochloric acid. The thus obtained aqueous solution acidified with hydrochloric acid and containing such a metal ion dissolved therein can be used as the reaction treatment agent for the wet decomposition of dioxins in the present invention.

The term "catalyst" used in the present specification is intended to include those which have a function to rendering dioxins harmless while being changed their valence. Thus, the above-described metal ion used as the catalyst does not necessarily have the same valence. The metal ion may be a mixture of a low valence metal ion and a high valence metal ion, for example, a mixture of a monovalent copper ion and a divalent copper ion. A metal ion whose valence increases or decreases during the reaction may also be used. Illustrative of the suitable reaction treatment agent is an aqueous solution acidified with hydrochloric acid and containing cuprous chloride and cupric chloride.

The aqueous solution used as the reaction treatment agent in the present invention may contain a substance (contact accelerating agent) capable of accelerating the contact of dioxins with the aqueous solution. The contact accelerating agent may include surfactants and alcohols. The kinds of the surfactants are not specifically limited. Anionic, cationic, nonionic and amphoteric surfactants may be used. The amount of the surfactant added to the aqueous solution is 0.005–1% by weight, preferably 0.01–0.5% by weight. As the alcohol, a lower alcohol such as methanol, ethanol or propanol may be suitably used. The amount of the alcohol is 0.5–10% by weight, preferably 1–10% by weight.

In the present invention, it is preferred that the reaction treatment agent be irradiated with an ultrasonic wave for the purpose of accelerating the contact between the reaction treatment agent and dioxins. Ultrasonic waves customarily used for the formation of emulsions may be suitably used for the purpose of the present invention.

If necessary, the reaction treatment agent can be contacted with oxygen or an oxygen-containing gas to enhance the concentration of oxygen dissolved therein. As the method for contacting the aqueous solution with oxygen or an oxygen-containing gas, there may be mentioned a method in which the oxygen or oxygen-containing gas is blown into the reaction treatment agent, a method in which the oxygen or oxygen-containing gas is contacted with fine droplets of the reaction treatment agent and a method in which the reaction treatment agent is brought into counter-current contact with the oxygen or oxygen-containing gas in a packed column. As the oxygen-containing gas, there may be mentioned air and oxygen-enriched air.

In the process of converting dioxins into harmless substances according to the present invention, dioxins alone are rarely subjected to the treatment. Rather, dioxins are generally treated in the state where they are deposited on solids. Examples of the solids on which dioxins are deposited include combustion ashes discharged from various kinds of combustion furnaces. The combustion ashes include fly ashes contained in flue gases discharged from combustion furnaces and bottom ashes accumulated on bottoms of furnaces. Such combustion ashes generally contain unburnt carbon (or carbonaceous materials) within which dioxins are present. Thus, it is very difficult to convert such dioxins into harmless substances. Thus, when such combustion ashes are treated with the reaction treatment agent into a harmless substance, it is preferred that the contact accelerating agent for accelerating the contact between the reaction treatment agent and the dioxins be used. Alternatively, for the purpose of accelerating the contact between the reaction treatment agent and the dioxins, it is effective to irradiate the reaction treatment agent with an ultrasonic wave or pretreat the combustion ashes by, for example, pulverization or incineration to reduce the unburnt carbon content.

When a combustion ash is used as a raw material to be treated, the combustion ash generally contains unburnt carbon or carbonaceous materials. Since the carbonaceous materials prevents the dioxins contained therein from contacting with the aqueous solution, it is difficult to convert the dioxins into harmless substances. This difficulty increases as the amount of the carbonaceous materials increases. For this reason, it is preferred that the amount of carbonaceous materials contained in a combustion ash be previously reduced. According to the studies of the present inventors, it has been found to be desired that the amount of the carbonaceous materials be 2% by weight or less, preferably 1% by weight or less, more preferably 0.5% by weight or less. To achieve this purpose, it is preferred that the combustion conditions in a combustion furnace for combusting wastes such as refuses be controlled so that the amount of carbonaceous materials contained in a combustion ash discharged therefrom is reduced. Further, in the case of a treatment of a fly ash or a bottom ash to which a large amount of carbonaceous materials deposit, it is preferred that the ash be combusted to reduce the amount of the carbonaceous materials before treating the ash into a harmless substance.

Solids having deposits of dioxins may be dioxin-polluted soils as well as the above-described combustion ashes such as fly ashes and bottom ashes.

According to the present invention, not only dioxins by themselves but also such dioxins deposited on solids may be treated into harmless substances. In this case, since the treatment temperature is lower than the boiling point of water, energy consumption is very small and the apparatus costs are low. The treatment time is about 1–100 hours. Concretely, however, the treatment time varies depending upon the treatment conditions including the state in which dioxins to be treated exist and the composition of the reaction treatment agent as well as the decomposition rate of dioxins. Thus, it is difficult to unconditionally determine the treatment time. In the present invention, it is important that the dioxin decomposition rate should be at least 60%, preferably at least 80%, more preferably at least 90%. In other words, by suitably selecting the treatment conditions, inclusive of the composition of the reaction treatment agent and treatment time, the kind of the catalyst contained in the reaction treatment agent and the pretreatment conditions for enhancing the reactivity of dioxins, etc., it is possible to attain a dioxin decomposition rate of at least 60%, preferably at least 80%, more preferably at least 90%. The process of decomposing dioxins with a decomposition rate of at least 60% by using a cheap reaction treatment agent such as an aqueous hydrochloric solution and a low treatment temperature which is greatly lower than the boiling point of water has been first developed by the present inventors.

BRIEF DESCRIPTION OF THE DRAWINGS

FIG. 9 is an example of a flow sheet for treating a fly ash-containing flue gas discharged from a combustion furnace by the process of the present invention using two Agas-liquid contacting steps (in FIG. 9, the reference numeral 1 designates a first gas-liquid contacting step, 2 a second gas-liquid contacting step, 3 a dioxin decomposing step, 4 a solid-liquid separating step, 5 a waste water treating step and 6 designates a fly ash treating step);

Figure 1:
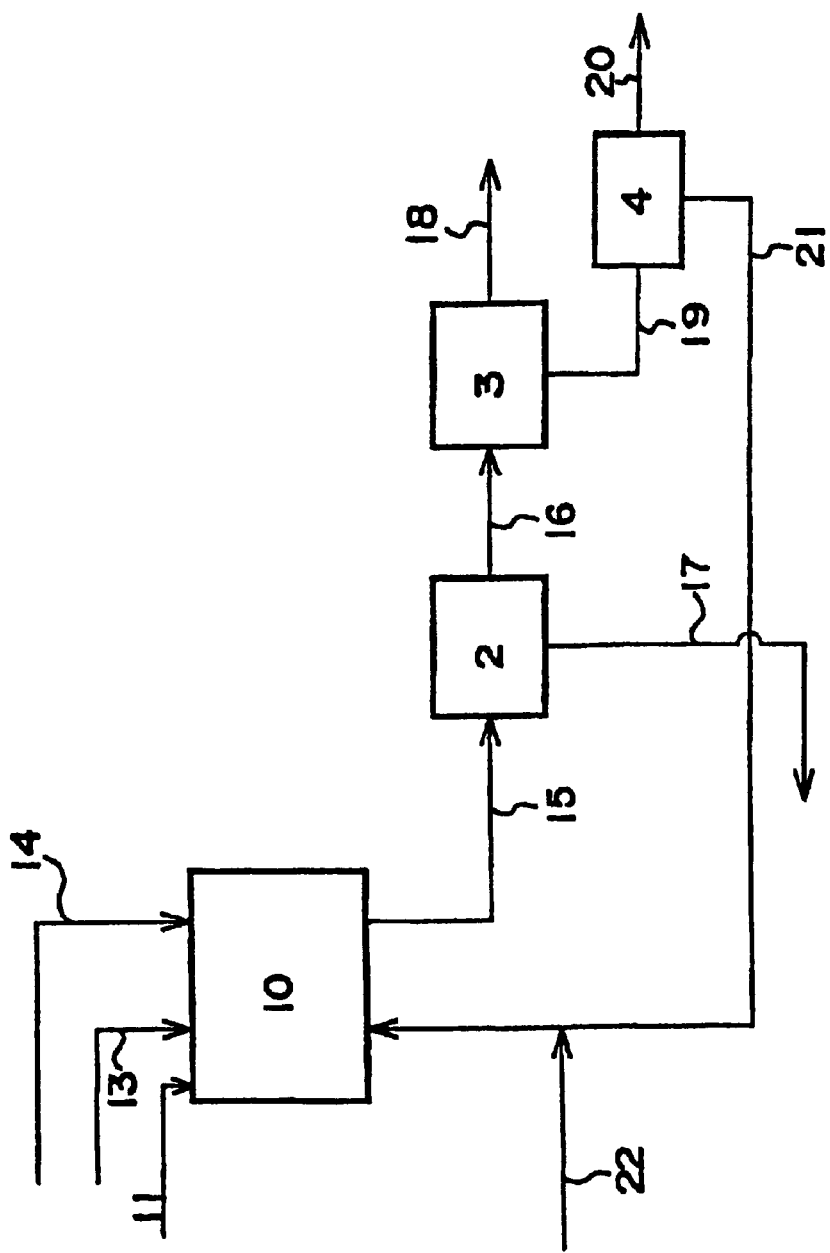
FIG. 1 shows an example of a flow sheet for treating a dioxin-containing fly ash in accordance with the present invention (in FIG. 1, the reference numeral 10 designates a solid-liquid contacting device, 2 a solid-liquid separating device, 3 a metal separation device and 4 designates a copper separating device)

In the treatment of dioxin-containing fly ash according to the flow sheet shown in FIG. 1, the dioxin-containing fly ash is fed through a line 11 to the solid-liquid contacting device 10 maintained at a temperature lower than 100° C.

The solid-liquid contacting device 10, in which the dioxin-containing fly ash is contacted with an aqueous solution acidified with hydrochloric acid and containing a catalyst dissolved therein, is adapted to convert the dioxins into harmless substances. The solid-liquid contacting device 10 may have any desired structure as long as it permits a contact of a dioxin-containing fly ash with a liquid.

A make-up aqueous solution acidified with hydrochloric acid is fed through a line 13 to the solid-liquid contacting device 10 for being contacted with the dioxin-containing fly ash. If necessary, an aqueous alkaline solution is fed through a line 14 to the device 10. As the aqueous alkaline solution, there may be used a solution or slurry obtained by dissolving or dispersing an alkaline substance such as sodium hydroxide, sodium carbonate, potassium hydroxide, calcium carbonate or magnesium hydroxide in water.

The chlorine ion concentration of the aqueous solution used in the solid-liquid contacting device 10 is at least 10 mmol/liter, preferably at least 100 mmol/liter. The pH of the aqueous solution is 7 or less, preferably 6–2. A pH of less than 2 causes problems because corrosion of the device occurs significantly and because a difficulty is caused in filtering the aqueous solution after the dioxin decomposition treatment. It is desired that the aqueous solution contain a copper ion as the catalyst. The copper ion is fed through a line 22. When the fly ash contains copper, the copper is dissolved into the aqueous solution to form a copper ion. Therefore, the copper contained in the fly ash can be utilized as the copper ion. In this case, it is not necessary to feed a copper ion through the line 22. Copper obtained in the copper separation device 4 may be recycled to the device 10 through a line 21 for use as the copper ion. The concentration of the copper ion in the aqueous solution to be contacted with the dioxin-containing fly ash in the solid-liquid contacting device 10 is 20–10,000 mg/liter, preferably 100–5,000 mg/liter.

In the solid-liquid contacting device 10, the dioxin-containing fly ash is contacted with the aqueous solution to decompose the dioxins in the fly ash. In the present invention, at least 60%, preferably at least 80%, more preferably at least 90% of the dioxins are decomposed. To achieve this purpose, there may be employed a method in which a sufficient residence time of the fly ash in the solid-liquid contacting device is ensured and in which the reaction time is controlled to be prolonged. In order to accelerate the decomposition of dioxins while reducing the time required for the decomposition thereof (reaction time), it is necessary to adjust the aqueous solution to have properties suited for the decomposition of the dioxins by incorporating a catalyst, especially copper ion, in the aqueous solution as described above.

Dioxin-containing fly ashes are discharged when, for example, city refuse is combusted. When the fly ash contains unburnt carbon, it is significantly difficult to convert the dioxins into harmless substances. As described previously, in order to effectively decompose the dioxins in such fly ashes, it is effective to reduce the amount of unburnt carbon deposited thereon to as low a level as possible. In the present invention, as described previously, it is desirable that the unburnt carbon content of the fly ash be 2% by weight or less, preferably 1% by weight or less, more preferably 0.5% by weight or less. To achieve this purpose, it is necessary to completely combust a material to be combusted, such as refuse, in a combustion furnace in the presence of sufficient oxygen and to reduce the amount of the carbonaceous materials. When a fly ash has a high unburnt carbon content, it is preferred that the aqueous solution to be contacted with the fly ash contain a contact-accelerating agent for accelerating the contact between the dioxins and the aqueous solution, as described previously.

The treated fly ash after being subjected to a solid-liquid contact in the solid-liquid contacting device 10 is introduced through a line 15 into the solid-liquid separation device 2 where it is subjected to a solid-liquid separation. The solid-liquid separation device 2 may have any desired structure as long as it can separate a solid contained in a liquid. Examples of the separation devices include a filtering device, a centrifugal separation device and a sedimentation separation device.

In the solid-liquid separation device 2, solid substances such as fly ash contained in the aqueous solution are separated. The aqueous solution from which the solid substances have been separated is introduced through a line 16 into the metal separation device 3. The metal separation device 3 may have any desired structure as it can separate heavy metal ions contained in the aqueous solution. Examples of the separation devices include a device adapted for sedimentating metal ions as a precipitate and a device containing a metal ion absorbent (such as an ion-exchange resin or a chelating resin).

The metals separated in the metal separation device 3 are fed through a line 19 to the copper separation device 4 where a catalytic metal, such as copper, contained therein is separated. The copper is fed, in the form of a water-soluble copper compound (such as copper chloride), through the line 21 to the solid-liquid contacting device 10. The copper separation device 4 may have any desired structure as long as it can separate copper from metals. Examples of such separation devices include a device adapted for selectively dissolving or precipitating a copper compound among metal compounds and a device for selectively adsorbing a copper compound among metal compounds. In the present invention, it is not necessary that the metal separation device 3 and the copper separation device are provided separately. Only one device can be used when the device has both of the functions of separating metals from an aqueous solution acidified with hydrochloric acid and of separating copper from metals.

The solution (waste solution) after the separation of metals in the metal separation device 3 is neutralized and then discharged through a line 18 and is discarded to a river, etc.

In the present invention, by maintaining the fly ash in contact with the aqueous solution for a predetermined period of time, the dioxins contained in the fly ash can be almost completely decomposed into harmless substances. In this case, for the purpose of enhancing the contacting efficiency between the dioxins and the aqueous solution, it is desirably to add a contact-accelerating agent or to perform ultrasonic irradiation as described previously.

Figure 2:
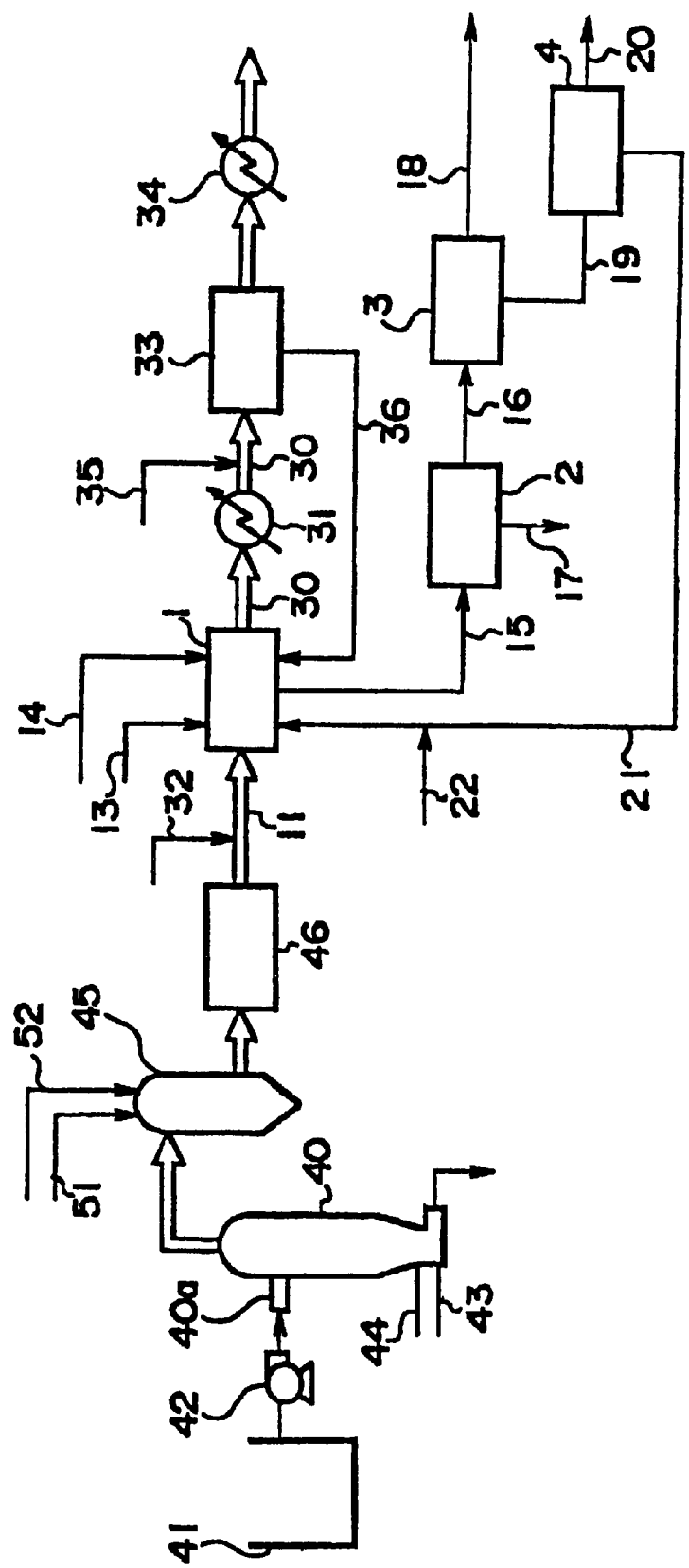
FIG. 2 shows an example of a flow sheet for treating a flue gas containing a fly ash discharged from a combustion furnace in accordance with the present invention, (in FIG. 2, the reference numeral 40 designates a combustion furnace (melting furnace))

In the flow sheet shown in FIG. 2, the melting furnace 40 has an upper portion provided with a refuse feeding port 40a to which shredded refuse is supplied by a dust supplier 42, such as a pusher using a piston or a pump, from a shredded refuse pit or hopper 41. To bottom portions of the furnace, there are connected an oxygen-enriched air feeding pipe 43 and an auxiliary fuel supplying pipe 44. The oxygen-enriched air is separated from air by a PSA separator and is used for maintaining the inside of the furnace at a high temperature by contact with a char produced by thermal decomposition of the refuse. Disposed in the downstream side of the melting furnace 40 is a secondary combustion chamber 45 for completely combusting a thermal decomposition gas obtained by the thermal decomposition of the refuse and being in a reducing atmosphere. The secondary combustion chamber 45 is provided with an air feeding pipe 51 and a water (such as dirty water from the refuse pit) feeding pipe 52. A waste heat recovering boiler is provided on an outlet side of the secondary combustion chamber 45. The heat recovered in the boiler 46 is used for operating a turbine (not shown) connected to a generator, so that the above waste heat can be recovered as an electric power.

Provided on a downstream side of the boiler 46 is a gas-liquid contacting device 1 into which a flue gas containing a fly ash is introduced after being cooled using a flue gas cooling water supply pipe 32. The gas-liquid contacting device 1 has a water feeding pipe 13 and a pH controlling aqueous alkaline solution feeding pipe 14. A solid-liquid separation device 2 is connected to the gas-liquid contacting device 1 through an aqueous solution transferring pipe 15. To the solid-liquid separation device 2 is connected a metal separation device 3 to which a copper separation device 4 is connected.

The gas-liquid contacting device 1 has a flue gas outlet duct to which, through a mist separator (not shown), a heat exchanger 31 for heating the flue gas fed from the device 1 through a flue gas flow line 30, a bag filter (dust collector) 33 for collecting a fly ash, etc. remaining in the flue gas and a heat exchanger 34 for heating the flue gas before discharge to the air for preventing the formation of white smoke are successively connected in this order. The flue gas after the passage through the heat exchanger 34 is discharged to the air through a stack. A recycling line 36 is connected to the bag filter 33 for recycling the fly ash collected therein to the device 1.

In the combustion treatment of a waste material such as refuse and the treatment of the flue gas from the combustion furnace according to the flow sheet shown in FIG. 2, the refuse is first fed to the melting furnace 40 from the refuse feeding port 40a. The shredded refuse is thus thermally decomposed to form a thermal decomposition gas and a carbonaceous char having a high calorific value. The char is combusted with the oxygen-enriched air and the auxiliary fuel supplied from the feed lines 43 and 44, respectively, so that a bottom portion of the melting furnace is kept at a high temperature of about 1,650° C. As a result, three, contiguous zones consisting of a bottom combustion and fusion zone, a middle thermal decomposition zone and a top drying zone are formed within the refuse melting furnace 40. In the bottom combustion and fusion zone, incombustible substances of the refuse are converted into a non-polluting fused slug (a melt of metals and glass) which in turn is continuously discharged from the bottom of the furnace. At the same time, a high temperature gas generated by reactions in the bottom portion of the melting furnace (combustion furnace) 40 is moved upward to the thermal decomposition zone where the gas is used for the thermal decomposition of the feed of the refuse to form a thermal decomposition gas in a reducing atmosphere. The refuse just fed to through the feed port 40a is thus dried with the thermal decomposition gas.

The thermal decomposition gas is fed to the secondary combustion chamber 45, to which air and dirty water are fed through the pipes 51 and 52, respectively, and is perfectly combusted. The waste heat is thermally exchanged with steam in the boiler 46 and the heated steam is used for driving the turbine and generator by which an electric power is recovered. The flue gas from which the waste heat has been thus recovered is contacted with water sprayed into a duct 11 through a flue gas cooling water feed pipe 32 and is thus adiabatically cooled to a temperature lower than 100° C. (generally about 65° C.). The cooled gas is then introduced into the gas-liquid contacting device 1.

In the gas-liquid contacting device 1, the flue gas is contacted with the aqueous solution containing a catalytic metal ion (copper ion) to capture the fly ash contained in the flue gas in the aqueous solution and to extract metal components contained in the fly ash into the aqueous solution. Further, acidic gases, such as hydrogen chloride gas, contained in the flue gas are absorbed in the aqueous solution. In the gas-liquid contacting device 1, dioxins contained in the fly ash is almost completely decomposed into harmless substances by retaining the fly ash captured in the aqueous solution for a predetermined period of time. A portion of the liquid (slurry) in the device 1 is discharged therefrom and is fed to the solid-liquid separation device 2 through the line 15. A make-up water in an amount corresponding to the amount of the discharged liquid is introduced into the device 1 through the line 13 so that the amount of water in the system is maintained constant.

During the treatment of the flue gas in the device 1, the acidity of the aqueous solution may be lowered below a pH of 2 as time lapses, when the amount of the flue gas to be treated is large or when the concentration of hydrogen chloride gas is high. In such a case, a quantity of an alkaline water is fed through the line 14 to the aqueous solution so that the pH thereof is maintained in a predetermined range.

The flue gas discharged from the gas-liquid contacting device 1 generally has a dust concentration of about 0.1–0.3 g/Nm$^3$. The flue gas is treated in a mist eliminator (not shown) for the removal of a mist therefrom and is then fed to the heat exchanger 31 where the flue gas is heated to a temperature higher by at least 20° C. than the water saturated temperature so as to avoid occurrence of a trouble attributed to local condensation in the succeeding bag filter 33. The heated flue gas is then fed to the bag filter 33 where the fly ash remaining in the flue gas is removed. The flue gas thus converted into a harmless substance is further heated with the heat exchanger 34 and then discharged to the air from a stack.

The fly ash collected in the bag filter 33 is fed through the recycling pipe 36 to the gas-liquid contacting device 1 where dioxins contained therein are decomposed into harmless substances.

In the solid-liquid separation device 2, the fly ash in the aqueous solution is separated. The separated fly ash which is high in safeness because dioxins have been decomposed into harmless substances is discharged through a line 17 from the solid-liquid separation device 2. On the other hand, the aqueous solution from which the fly ash has been removed is fed through a line 16 to the metal separation device 3 where heavy metal components dissolved therein are removed. The thus separated metals are fed through a line 19 to the copper separation device 4 to separate copper. The separated copper is, if necessary after being converted into a water-soluble copper compound (such as copper chloride), recycled through a line 21 to the gas-liquid contacting device 1. The metals from which copper has been separated are discharged through a line 20.

The aqueous solution from which metals have been separated in the metal separation device 3 is discharged through a line 18.

When a flue gas from a combustion furnace contains hydrogen chloride or when a fly ash contained in the flue gas contains catalytic metals such as copper, it is not necessary to add a catalyst or an aqueous acidic acid containing a chlorine ion from outside in order to treat the flue gas into a harmless substance according to the present invention. In such a case, the flue gas can be treated into a harmless substance by addition of only an industrial water from outside.

Further, the above-described step of retaining the aqueous solution containing the fly ash (dioxin decomposition reaction step) may be carried out not only in the gas-liquid contacting device but also in a reactor to which the aqueous solution containing the fly ash is charged after being discharged from the gas-liquid contacting device. When the above step is carried out in the reactor, it is easy to optimize the treating conditions such as a temperature, a pH, a chlorine ion concentration and a catalyst concentration. Therefore, it is preferable to perform the decomposition of dioxins in a fly ash into harmless substances in a reactor disposed separately from the gas-liquid contacting device.

Figure 3:
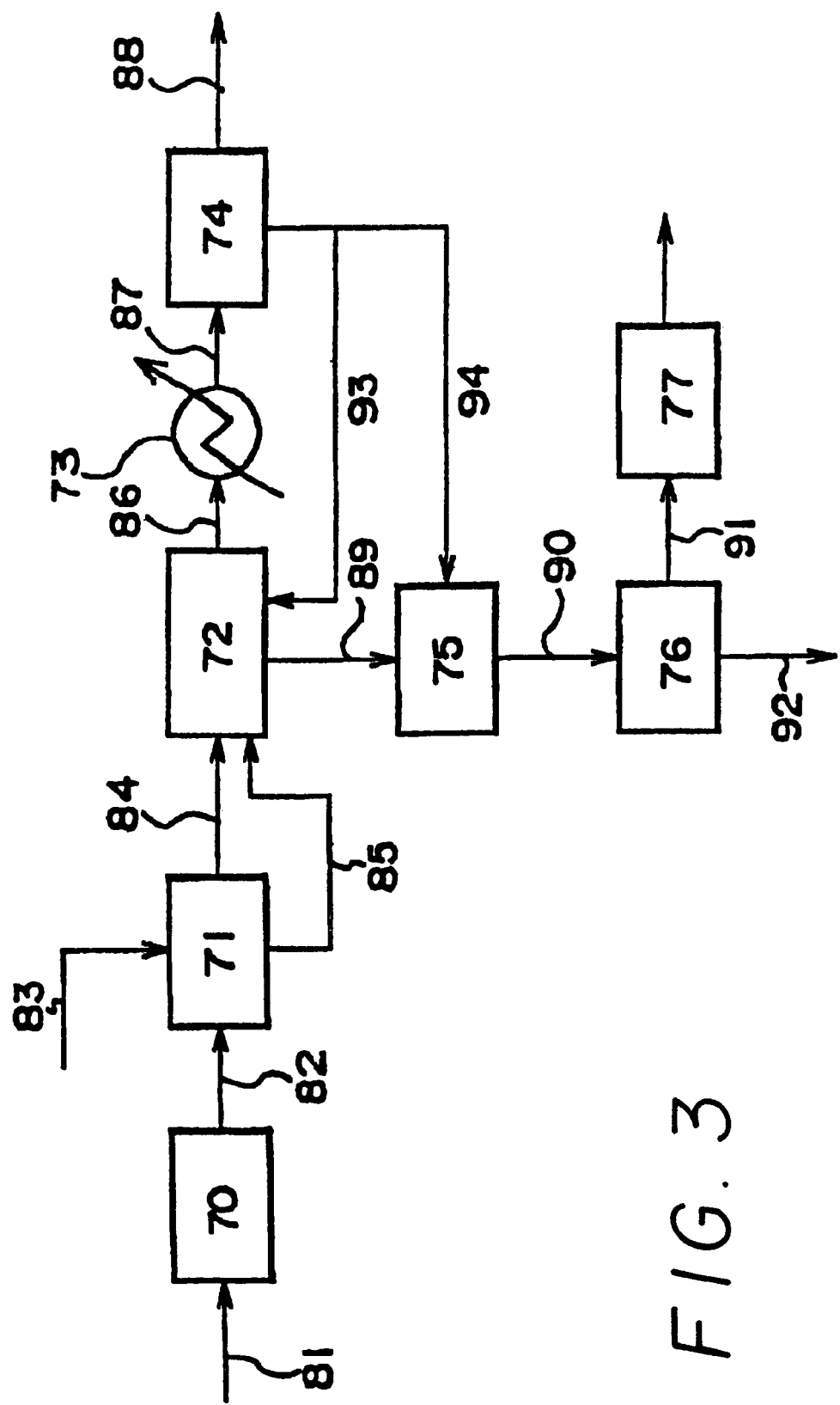
FIG. 3 shows an example of a flow sheet for treating a flue gas from a combustion furnace in accordance with the present invention, wherein the flue gas contains hydrogen chloride and a fly ash containing a catalyst metal and wherein the treatment for converting dioxins contained in the fly ash into harmless substances is carried out in a reactor disposed separately from a gas-liquid contacting device (in FIG. 3, the reference numeral 70 designates a boiler, 71 a cooling device, 72 a gas-liquid contacting device, 73 a heat exchanger, 74 a dust collector, 75 a reactor, 76 a solid-liquid separating device and 77 designates a waste water treatment device)

FIG. 3 is an example of a flow sheet for treating dioxins contained in a fly ash using a reactor disposed separately from a gas-liquid contacting device. The fly ash is contained in a hydrogen chloride-containing flue gas from a combustion furnace and contains a catalyst.

In the treatment of the flue gas according to the flow sheet shown in FIG. 3, the flue gas which has a high temperature (about 900° C.) and which is discharged from a combustion device is fed through a line 81 to the boiler 70 to recover the heat thereof and to cool the flue gas to about 250° C. The flue gas is then fed to the cooling device 71 and further cooled there. As a result, the temperature of the flue gas is lowered to about 65° C.

The cooling device 71 has such a structure that a cooling water supplied through a line 83 is sprayed to form fine droplets which are contacted with the flue gas to adiabatically cool the flue gas. As a result of the cooling treatment of the flue gas in the cooling device 71, there are obtained a cooled flue gas and a cooling water which has caught a portion of the polluting substances, such as hydrogen chloride and the fly ash, contained in the flue gas upon contact therewith. The cooling water after the contact of the flue gas has absorbed hydrogen chloride in the flue gas and is in the form of an aqueous hydrochloric acid solution.

The flue gas and the aqueous hydrochloric acid solution in the cooling device 71 are introduced through lines 84 and 85, respectively, to the gas-liquid contacting device (exhaust gas washing device) 72 which may be of a liquid dispersing type such as a spray tower or a packed column or of a gas dispersing type such as a bubbling tower or a plate column.

As a result of the contacting treatment of the flue gas and the aqueous hydrochloric acid solution in the device 72, the polluting substances, such as acidic gasses and the fly ash, contained in the flue gas are almost completely transferred to the aqueous hydrochloric acid solution. The thus cleaned flue gas is fed through a line 86 to the heat exchanger 73, where the temperature thereof is increased by at least about 20° C. The heated flue gas is then fed through a line 87 to the dust collector 74 to remove the fly ash remaining therein. The flue gas from which the fly ash has been removed is discharged through a line 88. The fly ash collected in the dust collector 74 is separated and then transferred through a line 93 or 94 to the gas-liquid contacting device 72 or the reactor 75.

The aqueous solution obtained in the gas-liquid contacting device 72 and containing the fly ash which has been contacted with the flue gas is introduced through a line 89 to the reactor 75, where dioxins contained in the fly ash are converted into harmless substances.

Namely, the ash-containing aqueous solution is stirred in the reactor for a predetermined period of time during which the dioxins contained in the fly ash are decomposed into harmless substances. In this case, the aqueous solution absorbs hydrogen chloride gas contained in the flue gas and dissolves the catalyst contained in the fly ash therein. Therefore, the aqueous solution shows a suitable function of decomposing dioxins into harmless substances. The reaction time, which depends upon the amount of carbonaceous materials contained in the fly ash, is difficult to be determined unconditionally. In the case where a dioxin decomposition rate of 80% is to be achieved, for example, the reaction time is about 24–48 hours when the amount of carbonaceous materials in the fly ash is 0.5% by weight or less, and about 50–60 hours when the amount of the carbonaceous materials is about 1.5% by weight. In the presence of a contact-accelerating agent such as methanol, the reaction time is about 20–30 hours, when the amount of the carbonaceous materials is about 1.5% by weight. The reaction product obtained in the reactor 75 is fed through a line 90 to the solid-liquid separation device 76 and is subjected to a solid-liquid separation treatment. The solids (fly ash)

obtained are discharged through a line 92, while the aqueous solution separated is passed through a line 91 to a waste water treatment step 77 including a metal separation treatment.

Figure 4:
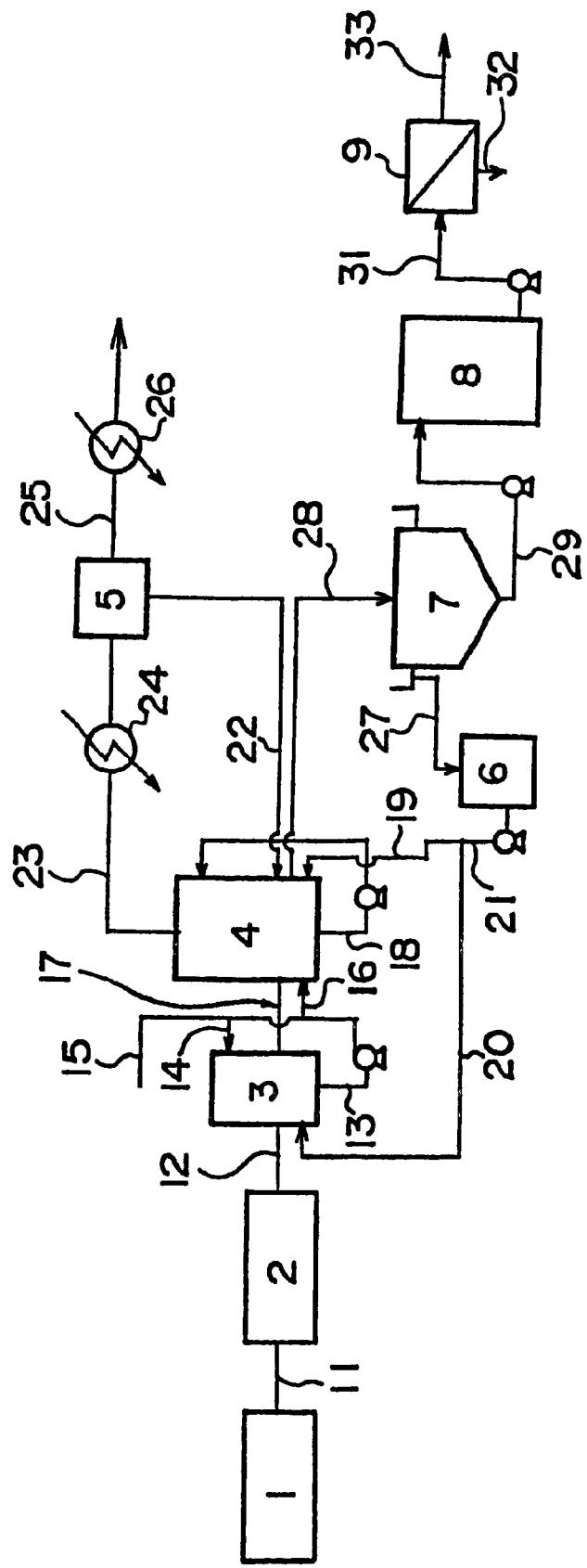
FIG. 4 shows another example of a flow sheet for treating a fly ash-containing flue gas discharged from a combustion furnace according to the present invention (in FIG. 4, the reference numeral 1 designates a combustion furnace, 2 a waste heat boiler, 3 a cooling tower, 4 a gas-liquid contacting device, 5 a dust collector, 6 a reservoir, 7 a thickener, 8 dioxin decomposition reactor and 9 designates a solid-liquid separating device)

In the treatment of a flue gas from a combustion furnace into a harmless substance according to the flow sheet shown in FIG. 4, the flue gas containing dioxin-containing fly ash and generated in the combustion furnace 1 is introduced into a waste heat boiler 2 through a line 11 to recover the heat thereof and is then fed to a cooling tower 3 through a line 12. The flue gas fed to the cooling tower 3 is contacted with fine droplets of a cooling liquid sprayed to an upper portion of the tower through lines 13 and 14. The flue gas is humidified and cooled by this contact to a temperature of about 60–75° C. which is a saturation temperature determined by the amount of moisture contained in the flue gas before the cooling. The cooled flue gas is fed to a gas-liquid contacting device 4 where it is contacted with an aqueous solution acidified with hydrochloric acid. As a result of the contact, the fly ash contained in the flue gas is captured by the aqueous solution and is removed from the flue gas, whereas the flue gas is discharged through a line 23 from the device 4. The flue gas is then introduced into a heat exchanger 24 and is heated to such a temperature that no condensation of water vapors occurs in a bag filter 5 provided downstream thereof. In the bag filter 5, residual fly ash in the flue gas is removed. The flue gas which has been passed through the bag filter 5 is introduced through a line 25 to a heat exchanger 26 where it is heated for preventing the formation of white smoke. The flue gas is, if necessary, subjected to a suitable treatment and is then discharged to the air. The pH of the above-described aqueous solution acidified with hydrochloric acid is 7 or less, preferably 2–6.

As the gas-liquid contacting device 4, there may be used any device as long as it has a function to capture fly ash contained in a flue gas in a liquid. For example, a vessel containing the aqueous solution may be used as such a device. The contact of the flue gas with the aqueous solution in the vessel may be carried out by blowing the flue gas through a nozzle into the aqueous solution.

In the gas-liquid contacting device 4, the flue gas is contacted with the aqueous solution acidified with hydrochloric acid and containing catalyst metal ion (such as copper ion) dissolved therein, so that the fly ash contained in the flue gas is captured by the aqueous solution with the metal components in the fly ash being extracted with the aqueous solution. Additionally, acidic gas such as hydrogen chloride contained in the flue gas is absorbed in the aqueous solution. The liquid component (in the form of a slurry) in the device 4 is withdrawn therefrom and introduced into a thickener 7 through a line 28.

To the cooling tower 3, makeup cooling water is fed through lines 14 and 15 so that the amount of liquid phase in the system is maintained constant. A portion of the cooling liquid used in the cooling tower 3 is fed through a line 16 to the gas-liquid contacting device 4.

As the treatment of the flue gas in the gas-liquid contacting device 4 proceeds, the acidity of the aqueous solution may be reduced below 2 when the amount of. the flue gas to be treated is large or when the concentration of hydrogen chloride is high. In such a case, an alkaline water is fed to the aqueous solution in such an amount as to maintain the pH within a predetermined range according to a detection signal from a detector of a pH controlling device.

The thickener 7 serves to function as a concentrating device for increasing the concentration of the fly ash in the fly ash-containing aqueous solution obtained in the gas-liquid contacting device 4. In the thickener 7, the fly ash in the aqueous solution falls by gravity so that the fly ash concentration in a surface portion of the aqueous solution is lowered while the fly ash concentration in a bottom portion is increased. The aqueous solution having an increased fly ash concentration (fly ash-concentrated liquid) is fed through a line 29 and a pump to a dioxin decomposing reactor 8. The aqueous solution having a low fly ash concentration, on the other hand, is fed to a reservoir 6 and is recycled through a pump and lines 21 and 20 to the cooling tower 3 as a cooling liquid. A portion of the low fly ash aqueous solution in the line 21 may be fed through a line 19 to the gas-liquid contacting device 4. In this case, a portion of the liquid in the line 19 may be fed to the cooling tower 3 with the remainder portion being fed to the contacting device 4.

The fly ash concentration rate in the thickener 7 is 2–60 times, preferably 3–50 times. It is preferred that the fly ash-concentrated liquid discharged from the thickener 7 have a fly ash concentration of at least 1% by weight. The upper limit of the concentration is not specifically limited but is generally about 30% by weight. The low fly ash aqueous solution discharged from the thickener 7 and having a reduced fly ash concentration has a fly ash concentration of not greater than 0.5% by weight, preferably not greater than 0.1% by weight.

By concentrating the fly ash-containing aqueous solution in the thickener 7 and by introducing the fly ash-concentrated liquid to the dioxin decomposing reactor 8, it is possible to make the reactor 8 compact and to increase the efficiency thereof. In order to increase the decomposition efficiency in decomposing dioxins in the reactor 8 into harmless substances, it is necessary to increase the residence time (reaction time) of the fly ash in the device 8 as long as possible. In this case, when the fly ash concentration in the aqueous solution is low, it is necessary to increase the volume of the reactor in correspondence to an increased residence time.

In the case of the present invention, since the fly ash-containing aqueous solution fed to the reactor 8 has a high fly ash concentration, the amount of fly ash per unit volume of the reactor is large so that the reactor may be made compact.

The low fly ash aqueous solution having a reduced fly ash concentration and obtained in the thickener 7 is suited for use as a cooling liquid for the cooling tower 3 and as a treating liquid for the gas-liquid contacting device 4. Namely, because of the low fly ash content and of fineness of the particle size of the fly ash, the aqueous solution does not cause troubles by friction and clogging in passage thereof through pumps, pipes and nozzles and-can be handled in the same manner as the ordinary industrial water.

In the dioxin decomposing reactor 8, dioxins contained in the fly ash are decomposed into a harmless state. Thus, the fly ash-containing aqueous solution is treated in the reactor with stirring for a predetermined period of time so that the dioxins in the fly ash are decomposed into harmless substances. The aqueous solution contains a catalyst and exhibits good dioxin decomposing function. From the standpoint of decomposition efficiency, a longer the residence time of the fly ash in the reactor 8 is preferable. Generally, however, the treatment conditions are so adjusted that the residence time is in the range of 1–100 hours. The dioxin decomposing reactor 8 is operated to provide a dioxin decomposition rate of generally at least 60%, preferably at least 80%, more preferably at least 90%.

The reaction product obtained in the reactor 8 is fed through a pump and a line 31 to a solid-liquid separating device 9 where it is subjected to a solid-liquid separating treatment. The solid phase (fly ash, etc.),obtained is discharged through a line 32, while the aqueous solution separated is fed through a line 33 to a waste treatment step including a metal separation treatment. A portion of the catalyst metal such as copper recovered by the metal separation treatment may be recycled to the dioxin decomposing reactor 8. In this case, the catalyst concentration in the dioxin decomposing reactor 8 is increased and is thus more effective.

The dioxin decomposing reactor 8 may be composed of a single reaction vessel or a plurality of reaction vessels. Since the reaction vessel is of a complete mixing vessel-type, a reactor having a good reaction efficiency may be obtained by connecting a plurality of reaction vessels in series. When a plurality of reaction vessels are used, reaction conditions such as concentration of the catalyst, concentration of chlorine ion and pH in respective reactors may be changed, so that dioxins may be efficiently decomposed into harmless substances.

In the treatment of the flue gas into a harmless substance according to the present invention, when the flue gas contains hydrogen chloride and when the fly ash contained in the flue gas contains catalyst metal such as copper, it is not necessary to add a catalyst or a chlorine ion-containing acidic aqueous solution from outside. Thus, it is possible to treat the flue gas into a harmless substance by mere addition of industrial water from outside.

In the present invention, the aqueous solution acidified with hydrochloric acid and containing a catalyst dissolved therein is used as a cooling liquid for the cooling step and as an aqueous solution for the gas-liquid contacting step. By this expedience, dioxins can be decomposed during the cooling and gas-liquid contact.

Accordingly, the residence time of the fly ash-containing aqueous solution in the dioxin decomposing reactor can be reduced. Thus, there is obtainable a merit that the reactor can be made compact.

In the present invention, it is possible to use liquid cyclone in place of the thickener. Similar to the thickener, the use of a liquid cyclone can give both an aqueous solution having an increased fly ash concentration and an aqueous solution having a decreased fly ash concentration. The former is introduced into the dioxin decomposing reactor, while the latter is fed to the cooling tower and/or the gas-liquid contacting device.

Figure 5:
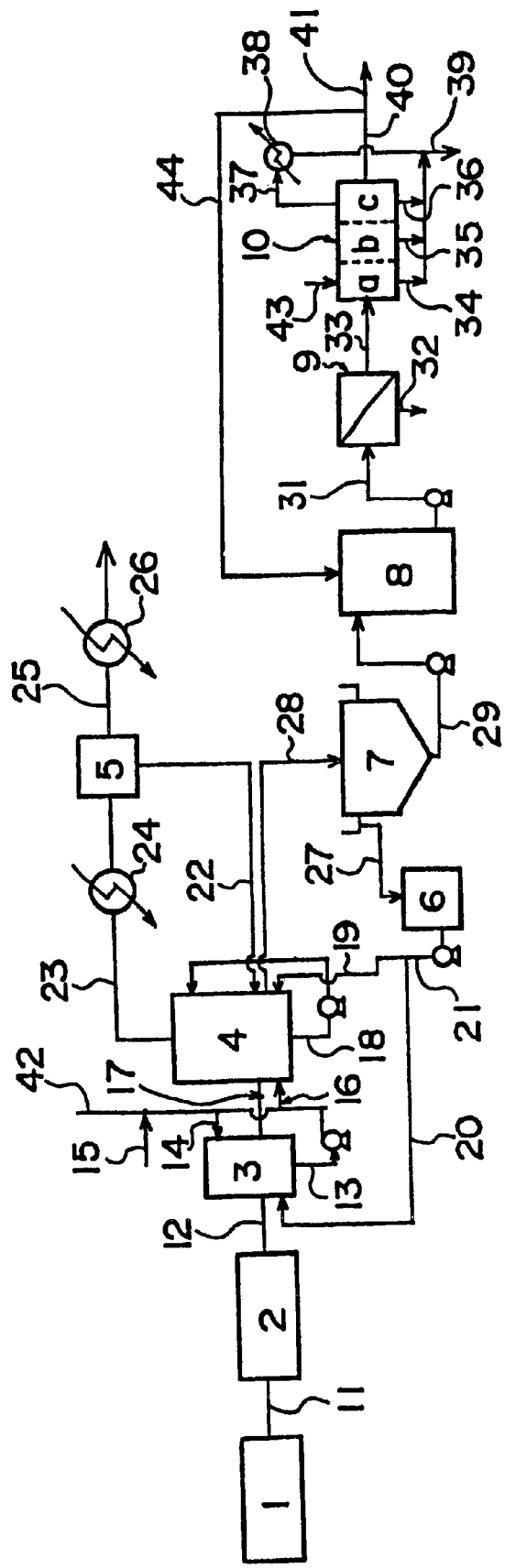
FIG. 5 shows a variant of the flow sheet shown in FIG. 4 (in FIG. 5, the reference numerals similar to those of FIG. 4 designate the same component parts and the reference numeral 10 designates an aqueous solution concentrating device (multi-effect evaporator)

The flow sheet shown in FIG. 5 differs from the flow sheet shown in FIG. 4 in that, in the former, an aqueous solution, which is discharged through a line 33 and from which fly ash has been separated in a solid-liquid separating device 9, is introduced to a concentrating device 10 and in that a part of the concentrated liquid is recycled to a dioxin decomposing reactor 8.

The concentrating device 10 is composed of a multi-effect evaporator. To this device, heated steam is fed through a line 43, while an aqueous solution from which fly ash has been separated is fed through a line 33. The heated steam and the aqueous solution thus introduced into the device 10 are indirectly contacted in a first evaporator "a", so that the aqueous solution is indirectly heated with the heated steam. Thus, water is evaporated from the aqueous solution in an amount corresponding to the amount of the heat received, so that the aqueous solution is concentrated. As a result of the indirect contact between the aqueous solution and the heated steam, the steam is condensed to yield condensed water which is discharged from a bottom of the evaporator "a" through a line 34.

The aqueous solution which has been subjected to the evaporation and concentration treatment in the evaporator "a" is then introduced into an evaporator "b" where it is indirectly contacted with the steam generated in the evaporator "a" and introduced to the evaporator "b". Thus, the aqueous solution is indirectly heated with the steam, and water is evaporated from the aqueous solution in an amount corresponding to the amount of the heat received, so that the aqueous solution is concentrated.

The condensed water produced as a result of the indirect contact between the steam and the aqueous solution is discharged through a line 35.

The concentrated liquid and the evaporated steam in the evaporator "b" are introduced into an evaporator "c" in the same manner as above and are indirectly contacted with each other in the same manner as above. Condensed water produced in the evaporator "c" is discharged through a line 36. The evaporated steam from the evaporator "c" is passed through a line 37 to a cooler 38 where it is condensed. The condensed water is then introduced into a cooling tower 3 through lines 39 and 42.

The concentrated liquid discharged through a line 40 from the evaporator "c" is introduced through a line 41 to a succeeding waste water treatment device and, after being subjected to a suitable waste water treatment there, is discarded. A portion of the concentrated liquid is recycled through lines 40 and 44 to a dioxin decomposing reactor 8. Recycling of the concentrated liquid to the reactor 8 can increase the catalyst concentration and chlorine ion concentration in the reactor, which contributes to both a reduction of the volume of the reactor and an improvement of the decomposition efficiency.

In the concentrating device 10, it is desirable that the aqueous solution from the solid-liquid separating device 9 be concentrated to the extent that no precipitation of chlorine compounds contained in the concentrated liquid occurs.

In the embodiments shown FIGS. 4 and 5, the cooling tower using a cooling liquid is employed to cool the flue gas from a combustion furnace to a temperature lower than 100 ° C. Cooling of the flue gas may be, however, performed by any other means such as by using a heat exchanger.

As described previously, the apparatus efficiency of the rector 8 is high when the fly ash concentration of the fly ash-containing aqueous solution fed to the dioxin decomposing reactor 8 is high. For example, when the residence time of the fly ash-containing aqueous solution is the same, doubling of the fly ash concentration in the aqueous solution can reduce the inside volume of the reactor to about ½. In order to increase the fly ash concentration in the aqueous solution fed to the reactor 8, it is necessary to improve the concentrating efficiency of the thickener 7. Since the aqueous solution contains salts formed from acidic gas in the flue gas and salts extracted from the fly ash, it is necessary to remove these salts from the system. When the concentration is performed to obtain a high fly ash concentration, the amount of the aqueous solution discharged is small. This results in an increase of the salt concentration in the system. When the salt concentration becomes near the saturation solubility, there occur such troubles that the salts are apt to precipitate a locations of the system where the temperature is cooled and that extraction of the salts from the fly ash is not complete. Therefore, when the concentration is carried out to obtain a high fly ash concentration, it is sometimes necessary to adjust the concentration of the salts in the system.

Figure 6:
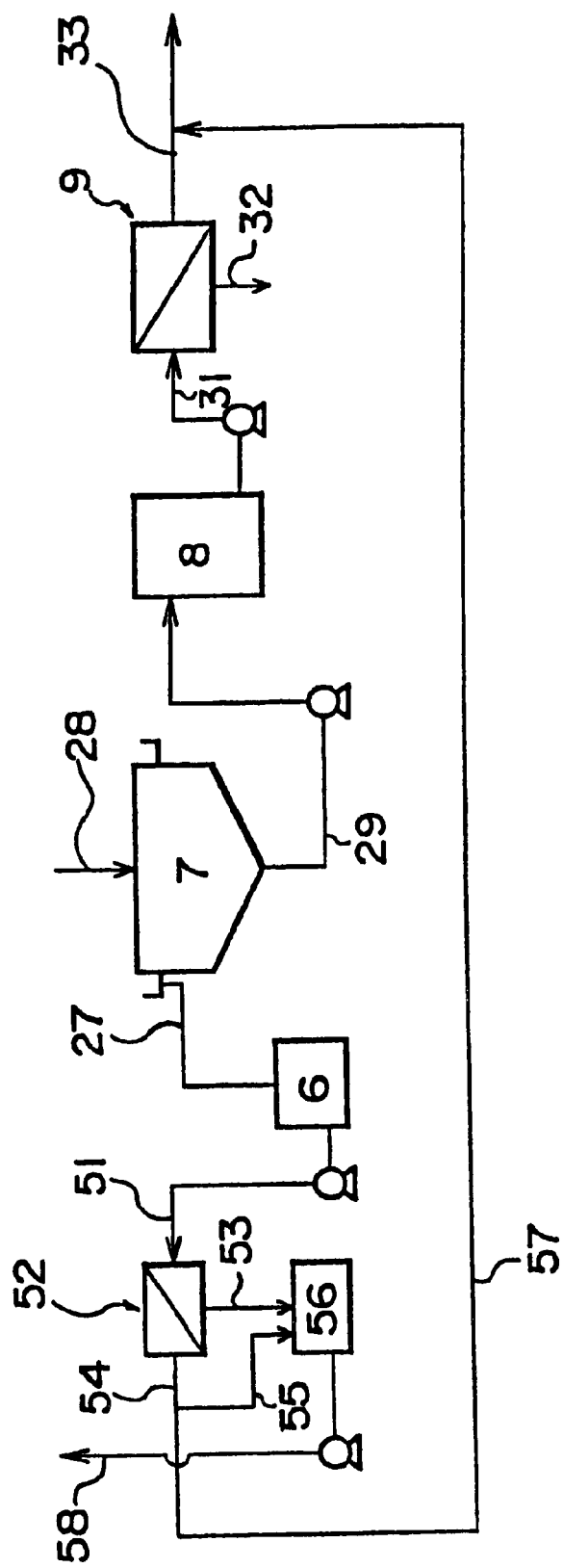
FIG. 6 shows a variant of the flow sheet shown in FIG. 4 (in FIG. 6, only a part of a total flow sheet that is related to a thickener 7 with the other parts that are the same as in FIG. 4 being omitted)

In FIG. 6, only a part of a total flow sheet that is related to a thickener 7 is shown, with the other parts of the flow sheet, which are the same as the flow sheet of FIG. 4, being omitted.

According to the flow sheet shown in FIG. 6, exhaust water from the system is discharged not only through a line 29 but also through a line 57. Therefore, it is possible to perform the concentration of the fly ash while adjusting the concentration of salts in the system.

Figure 7:
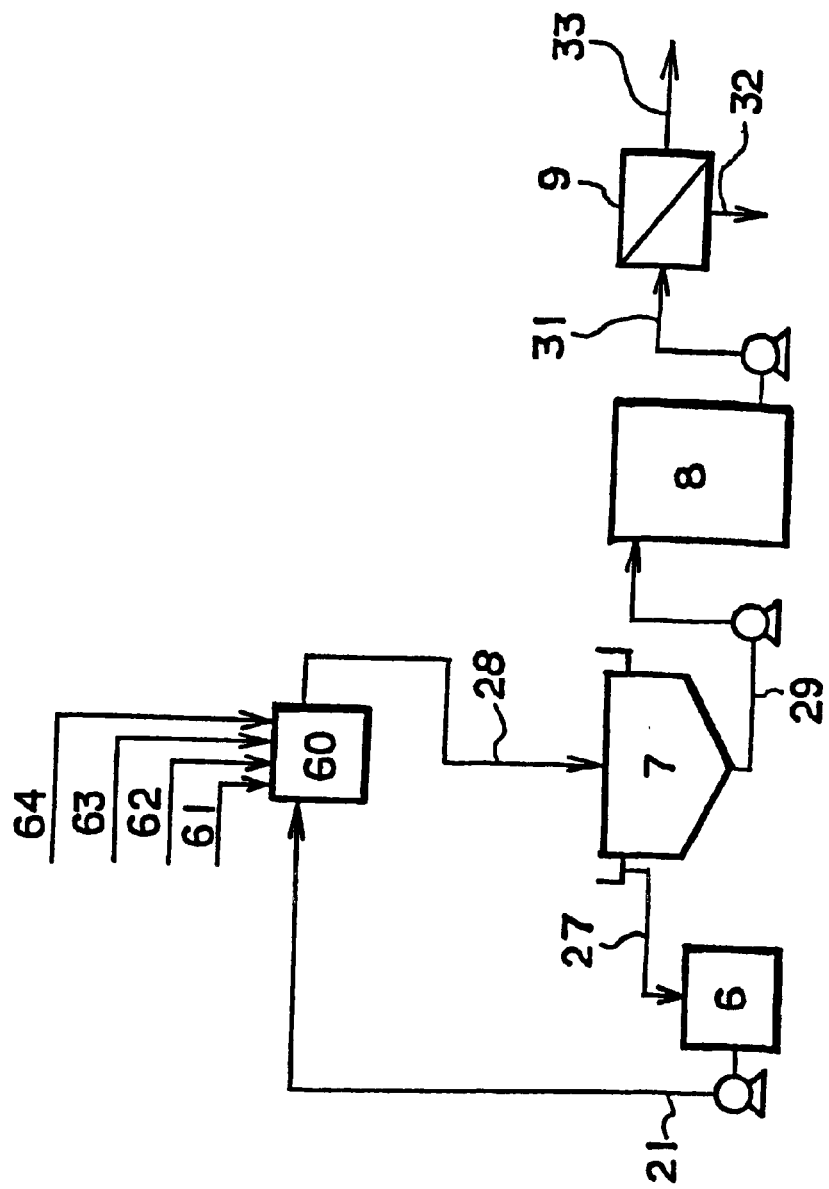
FIG. 7 shows a flow sheet for increasing the concentration of fly ash in an aqueous solution in a thickener 7 (in FIG. 7, the reference numeral 60 designates a fly ash slurry preparation vessel and the reference numerals similar to those of FIG. 6 designate the same component parts)

In the flow sheet shown in FIG. 7, a fly ash slurry prepared in a fly ash slurry preparation vessel is used in place of the fly ash-containing aqueous solution discharged from the gas-liquid contacting device 4 shown in FIG. 4. The flow sheet shown in FIG. 7 differs from the flow sheet for the treatment of the actual flue gas in that the former includes the fly ash slurry preparation vessel. However, the flow sheet of FIG. 7 is adopted because it is possible to easily carry out the concentration experiment for the fly ash-containing aqueous solution using the thickener 7.

In FIG. 7, designated as 60 is the fly ash slurry preparation vessel. Reference numerals in FIG. 7 which are similar to those in FIG. 6 designate the same component parts.

In the flow sheet shown in FIG. 7, fed to the fly ash slurry preparation vessel are a supernatant liquid in the thickener through a line 21, industrial water through a line 61, hydrochloric acid and sulfuric acid (simulation of acidic gas removed from the flue gas) through a line 62 and fly ash through a line 63. While stirring these components, a pH controlling agent is added through a line 64 to form a slurry.

Figure 8:
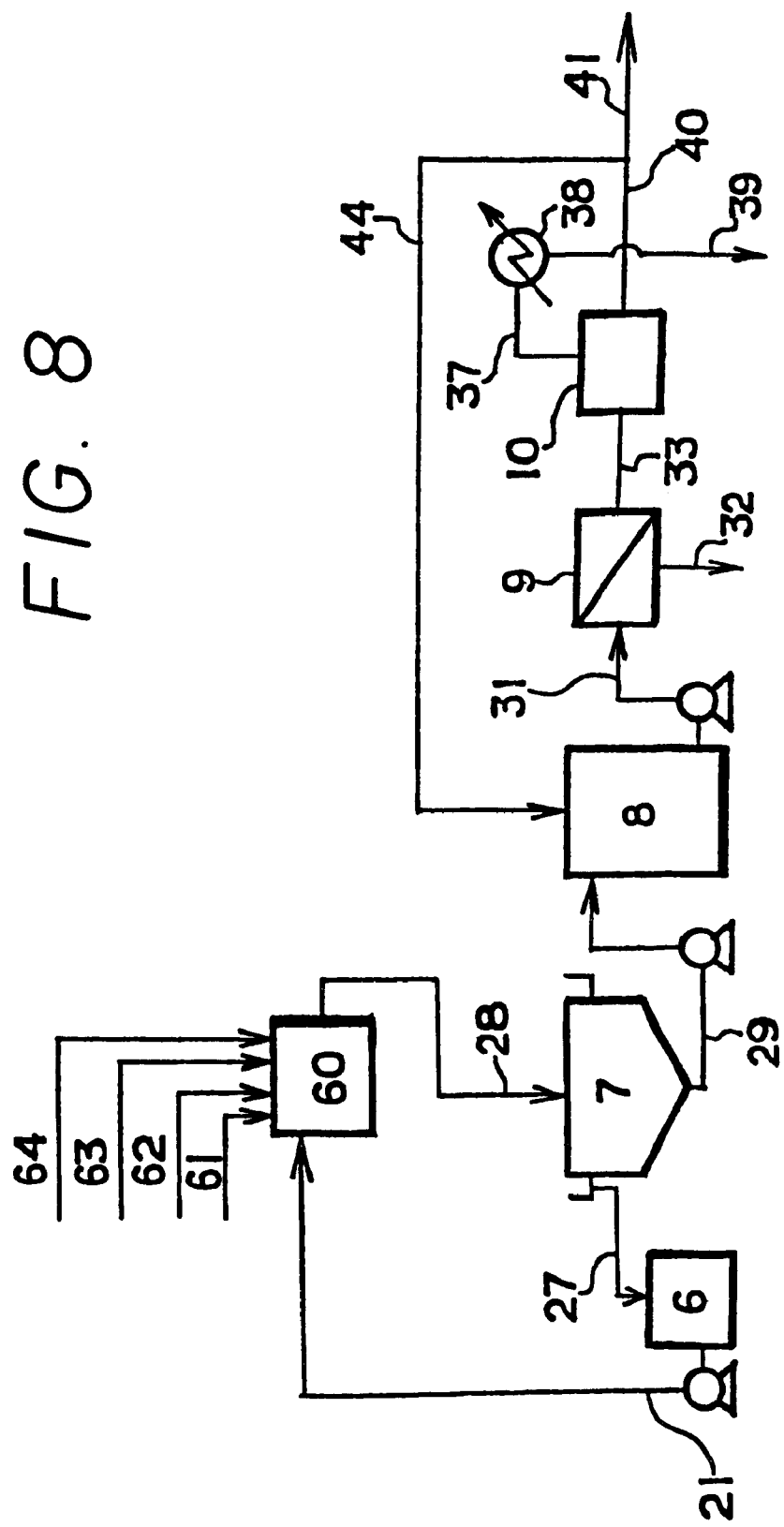
FIG. 8 shows another example of a flow sheet for increasing the concentration of fly ash in an aqueous solution in a thickener 7 (in FIG. 8, the reference numeral 60 designates a fly ash slurry preparation vessel and the reference numerals similar to those of FIG. 6 designate the same component parts)

In the flow sheet shown in FIG. 8, a fly ash slurry prepared in a fly ash slurry preparation vessel is used in place of the fly ash-containing aqueous solution discharged from the gas-liquid contacting device 4 shown in FIG. 4. The flow sheet shown in FIG. 8 differs from the flow sheet for the treatment of the actual flue gas in that the former includes the fly ash slurry preparation vessel. However, the flow sheet of FIG. 8 is employed because it is possible to easily carry out the concentration experiment for the fly ash-containing aqueous solution using the thickener 7.

In FIG. 8, designated as 60 is the fly ash slurry preparation vessel and as 10 a concentrating device by evaporation. Reference numerals in FIG. 8 which are similar to those in FIG. 7 designate the same component parts.

In the flow sheet shown in FIG. 8, an aqueous solution, which is discharged through a line 33 from a solid-liquid separating device 9 and from which fly ash has been removed, is fed to the concentrating device 10 where it is heated, so that part of water thereof is evaporated to effect concentration. The concentrated liquid is discharged through a line 40. A part thereof is recycled though a line 44 to a reactor 8, with the remainder portion being discharged through a line 41. Steam generated in the concentrating device 10 is cooled and condensed in a cooler 38 and discharged through a line 39.

In treatment of a flue gas from a combustion furnace into a harmless substance according to the flow sheet shown in FIG. 9, the flue gas is introduced into a first gas-liquid contacting step 1 through a line 11 where it is contacted with a first treating liquid to capture acidic gas and fly ash contained therein and to remove them therefrom.

The first treating liquid used in the first treatment step 1 is for mainly capturing hydrogen chloride (HCl) and fly ash contained in the flue gas. As the first treating liquid, there may be used industrial water, an acidic aqueous solution or an aqueous solution acidified with hydrochloric acid and containing a dioxin decomposing catalyst. When an acidic aqueous solution or an aqueous solution acidified with hydrochloric acid is used, the pH of the solution is preferably adjusted to a range of 2–4. When an acidic solution having a pH of 2–4 is used as the first treating liquid, it is possible to effectively absorb HCl contained in the flue gas in the treating liquid and to remove same from the flue gas.

When the flue gas is contacted with the first treating liquid, the temperature and the amount of the first treating liquid are generally such that the temperature of the treating liquid upon the gas-liquid contact is lower than 100° C., preferably lower than 80° C., though they depend upon the temperature and amount of the flue gas. When the temperature of the flue gas is 100° C. or more, for example, in the range of 110–300° C., the first treating liquid should possess a function as a cooling liquid for the flue gas, so that it is necessary to use a relatively large amount of the treating liquid having a low temperature or to use a number of spray nozzles to improve the gas-liquid contact thereof with the flue gas.

Through the gas-liquid contacting step using the first treating liquid, 30–95%, preferably 80–95%, of the fly ash in the flue gas is captured in the treating liquid. In such separation of the fly ash, those particles having large particle sizes are preferentially captured by the first treating liquid. Further, almost all of HCl in the flue gas is absorbed in the first treating liquid.

As a device for carrying out the first gas-liquid contacting step 1, any device may be used as long as it has a structure capable of capturing fly ash contained in the flue gas in the treating liquid. A device having a liquid spraying nozzle and such as structure in which fine droplets sprayed from the spray nozzle are contacted with the gas or a device having a gas blowing nozzle and a structure in which the gas is blown into the liquid may be used.

The flue gas which has been subjected to the contacting treatment with the first treating liquid in the first gas-liquid contacting step 1 is introduced through a line 12 into a second gas-liquid contacting step 2, where acidic gas and fly ash remaining in the flue gas are removed. The second gas-liquid contacting step is mainly for separating $SO_2$ and fly ash remaining in the flue gas therefrom.

In a first method for carrying out the second step, the flue gas is contacted with the second treating liquid to remove $SO_2$ and fly ash remaining in the flue gas therefrom. At the same time, the flue gas is cooled in the second gas-liquid contacting step to a temperature lower than that of the flue gas at an inlet of the second gas-liquid contacting step to condense moisture contained in the flue gas. A mist of the condensed water and the fly ash remaining therein are removed by a mist separator provided at an upper part of the second gas-liquid contacting step. In this case, water mist is formed with fine particles of the fly ash, which have passed through the first gas-liquid contacting step and which remain in the flue gas, serving as nuclei. Thus, the weight and size of the particles are increased, so that they are easily captured in the mist separator. As the mist separator, there may be used a demister in which separation is performed by collision or a wet-type electric dust collector. The use of the wet-type electric dust collector is preferred. As a washing liquid for the wet-type electric dust collector, industrial water or the second treating liquid may be used. The washing liquid preferably has a temperature equal to or lower than the temperature of the flue gas passing through the wet-type electric dust collector. For cooling the flue gas to a temperature lower than that of the flue gas at an inlet of the second gas-liquid contacting step, there may be employed a direct cooling method in which the second treating liquid is contacted with the flue gas after being cooled to a temperature below than that of the flue gas entering the second gas-liquid contacting step, or a method in which a heat exchanger is disposed in the second gas-liquid contacting step for indirectly cooling the flue gas. As the second treating liquid, condensed water from the flue gas may be used as such. Alternatively, an acidic aqueous solution or an aqueous solution acidified with hydrochloric acid and containing a catalyst for the decomposition of dioxins may be also used.

It is preferred that the pH of the second treating liquid be adjusted in the range of 4–6 for reasons of effective removal of $SO_2$ remaining in the flue gas. Further, by contact with the second treating liquid, the fly ash remaining in the flue gas may be removed and, hence, in combination of the removal of the water mist, the fly ash can be almost completely removed.

In the second gas-liquid contacting step 2, the flue gas is cooled to a temperature which is lower than that of the flue gas at an inlet of the second gas-liquid contacting step 2 and which is sufficient to condense water vapors. Generally, the cooling temperature is a temperature lower by 5–40° C., preferably 5–30° C., than that of the flue gas at an inlet of the second gas-liquid contacting step 2.

As a device for carrying out the second gas-liquid contacting step 2, a device generally used for contacting a gas with a liquid, such as a spray tower or a packed column may be used. When the above-described indirect cooling with a heat exchanger is carried out, such a heat exchanger may be disposed in a suitable position within the spray tower or the packed tower.

The wet-type electric dust collector may be disposed in an upper portion within the tower or at a position outside the tower.

In a second method, a packed column in which activated carbon is packed is used in the second gas-liquid contacting step, so that not only $SO_2$ and fly ash remaining in the flue gas but also gaseous dioxins are adsorbed and removed. Further, by contacting an aqueous solution acidified with hydrochloric acid and containing a catalyst dissolved therein as the second treating liquid, with the packed layer of activated carbon, dioxins adsorbed by the activated carbon are decomposed. The $SO_2$ remaining in the flue gas is, after having been adsorbed to the activated carbon, converted to sulfuric acid by the catalytic oxidation thereof and is removed. The sulfuric acid thus formed absorbs water contained in the flue gas to form dilute sulfuric acid which is liberated from the activated carbon and flowed down through the packed layer of the activated carbon. Upon the contact with the second treating liquid, the fly ash remaining in the flue gas is also removed. The contacting temperature in the second gas-liquid contacting step 2 may be the same as the temperature of the flue gas at an inlet of the second gas-liquid contacting step but is generally 30–80° C., preferably 50–70° C. The pH of the second treating liquid in the second gas-liquid treating step 2 is not required to be high, since $SO_2$ is removed by adsorption on the activated carbon and catalytic oxidation with the activated carbon. It is preferred that the pH be adjusted in the range of 2–6 which is effective for decomposition of dioxins adsorbed on the activated carbon.

The activated carbon preferably has such a form that does not cause significant pressure loss of the flue gas, such as granules or honeycomb. Granular activated carbon preferably has an average particle size of at least 2 mm. Activated carbon generally used for gas treatment or water treatment may be suitably used. It is preferred that the activated carbon be subjected to a hydrophobicity-imparting treatment such as heat treatment, fluorinating treatment or supporting of hydrophobic particles of, for example, polypropylene, vinyl chloride resin or tetrafluoroethylene. The amount of the hydrophobic particles supported is 1–15% by weight, preferably 3–10% by weight. As honeycomb-like activated carbon, there may be used a molded product obtained by molding a mixture of powder of activated carbon with a dispersing agent of hydrophobic particles such as tetrafluoroethylene dispersion into a honeycomb-like shape. The amount of the hydrophobic particles may be 3–20% by weight, preferably 5–15% by weight. When such activated carbon is used, dioxins are effectively adsorbed on the hydrophobic surfaces and are then removed and decomposed into harmless substances upon contact with the aqueous solution acidified with hydrochloric acid and containing a catalyst.

The treated flue gas obtained in the second gas-liquid contacting step is discharged through a line 13 and, if necessary, subjected to a treatment for the prevention of white smoke before being discharged to the air.

When a method in which the flue gas is cooled in the second gas-liquid contacting step is adopted, the thermal load required for customarily conducted heat treatment of the flue gas for the prevention of white smoke can be reduced, because the water content in the treated flue gas is decreased.

It is preferred that the second treating liquid discharged from the second gas-liquid contacting step 2 (second treatment waste liquid) be recycled through a line 23 to the first gas-liquid contacting step 1 and used as part of the first treating liquid. A part of the recycling liquid may be directly fed to the decomposition step 3.

The fly ash captured by the first treating liquid (first treatment exhaust liquid) in the first gas-liquid contacting step and the fly ash captured by the second treating liquid (second treatment exhaust liquid) in the second gas-liquid contacting step are, separately or jointly, brought into contact with an aqueous solution acidified with hydrochloric acid and containing a catalyst dissolved therein (treating agent) in the dioxin decomposition step 3. Examples of methods for performing the above step include a method in which the treating liquid containing these fly ashes is added into the treating agent and the mixture is stirred for a predetermined period of time, and a method in which the gas-liquid contacting treatment is carried out using an aqueous solution acidified with hydrochloric acid and containing a catalyst dissolved therein as the first treating liquid and, if desired, as the second treating liquid and in which the fly ash-containing treating liquid after the gas-liquid contacting treatment is fed to the reactor used in the decomposition step 3 and stirred for a predetermined period of time. In the aqueous solution acidified with hydrochloric acid and containing a catalyst dissolved therein used as at least the first treating liquid, a metal ion for the catalyst may be added from outside. Alternatively, a metal ion dissolved from the fly ash upon contact of the fly ash with the aqueous solution acidified with hydrochloric acid may be utilized as the catalyst. The hydrogen chloride (HCl) required for the formation of the aqueous solution acidified with hydrochloric acid may be added from outside or may be available from hydrogen chloride contained in the flue gas. When the flue gas contains both hydrogen chloride and catalyst metal-containing fly ash, the aqueous solution acidified with hydrochloric acid and containing a catalyst dissolved therein may be prepared by contacting the flue gas with industrial water in the first gas-liquid contacting step.

The dioxin decomposition step 3 is generally performed so that the decomposition rate of dioxins deposited on the fly ash is at least 60%, preferably at least 80%, more preferably at least 90%.

A conventional stirring-type reactor may be used as the decomposition vessel for the decomposition step 3. The decomposition step may be carried out by one stage treatment step or by an in series multi-stage step.

The decomposition treatment liquid obtained in the decomposition step 3 is fed to a solid-liquid separating step 4 for the separation of fly ash contained therein. The fly ash is introduced through a line 16 into a fly ash treating step 6 and treated there.

As a device for carrying out the solid-liquid separating step 4 for the separation of fly ash contained in the treatment liquid, there may be used, for example, a filtration device or a centrifugal separator. The separated fly ash in the form of a solid (cake-like) obtained in the solid-liquid separating step 4 is dried in the fly ash treating step 6. The dried fly ash is discharged through a line 18 for recovery as stabilized fly ash.

The separated liquid (waste water) obtained in the solid-liquid separating step 4 is discharged through a line 17 and is discarded after being subjected to a desired treatment in the waste water treating step 5, if necessary.

A portion of the separated liquid obtained in the solid-liquid separating step 4 is recycled through a line 19 to the first and/or second gas-liquid separating steps 1 and 2 for use as at least part of the first and/or second treating liquids. Thus, the catalyst accumulated in the first treatment liquid can be used in the second gas-liquid contacting step. If necessary, the catalyst may be added to the second treating liquid.

A line 22 connected to the second gas-liquid separating step 2 is used for feeding a part of the second treating liquid to a wet-type dust collector provided in the second gas-liquid contacting step 2.

When the flue gas from a combustion furnace is treated into a harmless substance in the manner described above, the fly ash-containing treating liquid obtained in the first gas-liquid contacting step may be fed to the reaction step 3 after increasing the fly ash concentration in the treating liquid in a concentrating step.

As a device for use in the concentrating step, there may be used, for example, a thickener or cyclone. In the concentrating step, a slurry containing fly ash at a high concentration, generally 1–20% by weight, preferably 4–20% by weight, and a low concentration liquid having a fly ash concentration of 0.5% by weight or less, preferably substantially zero %. As described previously, the slurry is fed to the decomposition step 3, while the low concentration liquid is fed to the first and/or second gas-liquid contacting steps 1 and 2 for use as part of the first and/or second treating liquids.

Figure 10:
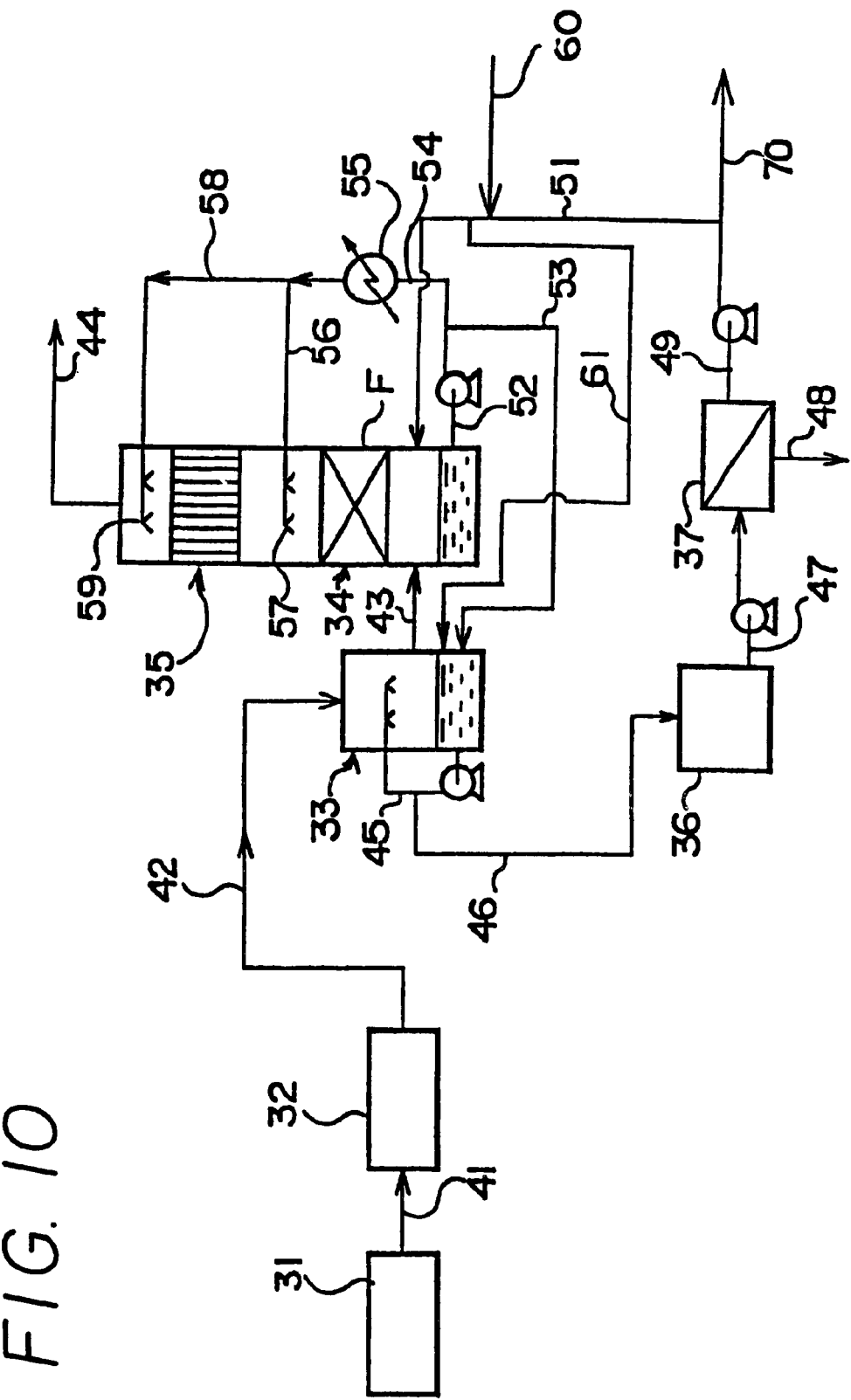
FIG. 10 is a flow sheet showing a detailed embodiment of the flow sheet of FIG. 9 (in FIG. 10, the reference numeral 31 designates a combustion furnace, 32 a waste heat boiler, 33 a first gas-liquid contacting device, 34 a second gas-liquid contacting device, 35 a wet-type electric dust collector, 36 a dioxin decomposing reactor and 37 designates a solid-liquid separating device)

In the treatment of a flue gas from a combustion furnace into a harmless substance according to the flow sheet shown in FIG. 10, the flue gas containing dioxin-containing fly ash and generated in the combustion furnace 31 is introduced into a waste heat boiler 32 through a line 41 to recover the heat thereof and is then fed to a first gas-liquid contacting device 33 through a line 42. The flue gas introduced into the first gas-liquid contacting device is contacted with fine liquid droplets of a first treating liquid fed through a line 45 and sprayed within the device and is rapidly cooled. At the same time, part of the fly ash and a greater part of HCl contained in the flue gas are captured by the first treating liquid and separated from the flue gas. The flue gas is cooled to 45–75° C., preferably 50–70° C. by the first gas-liquid contacting treatment. The treated flue gas which has been cooled and from which part of the fly ash and a greater part of HCl have been removed is fed through a line 43 to a second gas-liquid contacting device 34 where it is contacted with a second treating liquid. As a result of this contact, the fly ash and $SO_2$ remaining in the flue gas are captured by the second treating liquid and removed from the flue gas.

The first gas-liquid contacting device 33 shown in FIG. 10 has a liquid spray nozzle at an upper part of the tower. The first treating liquid contained in the bottom of the tower is fed through a line 45 and sprayed from the nozzle for contact with the gas. The structure of the device 33 is not limited to the above. For example, a structure in which the gas is blown through a nozzle into the liquid contained in a tank for performing the gas-liquid contact may be also adopted.

The second gas-liquid contacting device 34 shown in FIG. 10 has a packed layer formed therein. A liquid spray nozzle 57 is provided above the packed layer F. The packing material for the packed layer may be any known material such as TELLERETTE. Provided further above the packed layer F is a wet-type electric dust collector 35. The collector 35 is not required to be disposed above the packed layer F but may be provided independently from the second gas-liquid contacting device 34.

In the first gas-liquid contacting device 33, an aqueous solution acidified with hydrochloric acid and containing a dioxin decomposing catalyst is contained in the bottom thereof as the first treating liquid. The aqueous solution is fed through a pump and a line 45 and sprayed from a top of the device, so that the device is filled with fine liquid droplets of the aqueous solution. The flue gas (having a temperature of generally 150–300° C.) introduced from the waste heat boiler 32 through a line 32 is contacted with the fine liquid droplets so that the fly ash and HCl contained in the flue gas are captured thereby and removed from the flue gas. The liquid droplets capturing the fly ash, etc. flow down through the device and is combined with the liquid in the bottom of the device. In the first gas-liquid contacting treatment, the pH of the first treating liquid used in the first gas-liquid contacting device is adjusted to 2–4 so that HCl contained in the flue gas can be efficiently captured and separated by the treating liquid.

As a result of the first gas-liquid contacting treatment, 30–95%, preferably 80–95% of the fly ash contained in the flue gas is captured and removed by the first treating liquid. Further, at least 90%, preferably at least 95% of HCl contained in the flue gas is captured and removed by the first treating liquid.

A part of the exhaust water obtained in the solid-liquid separating device 37 is recycled through a line 51 to the second gas-liquid contacting device 34 as the second treating liquid. The recycled liquid is fed to a lower part of the device 34 and is combined with the liquid contained in the bottom of the device. The liquid contained in the bottom of the device is fed to a cooler 55 through a line 52 and a pump and is cooled to a temperature of 30–50° C. A portion of the cooled liquid is fed through a line 56 and sprayed through a liquid spray nozzle 57, with the remainder portion being fed through a line 58 and sprayed through a liquid spray nozzle 59.

In the second gas-liquid contacting step 34, the second treating liquid flows downward through the packed layer F and is contacted with the upwardly flowing flue gas, so that the fly ash and $SO_2$ remaining in the flue gas are captured by the downwardly flowing treating liquid. The treating liquid capturing the fly ash flows down through the packed layer F and is combined with the liquid contained in the bottom of the device.

In an upper space above the packed layer F of the second gas-liquid contacting device 34, the cooled second treating liquid is sprayed and, hence, the temperature of the upper space is lower than the temperature of the flue gas introduced through the line 43 to the device 34. Therefore, the moisture contained in the flue gas present at a position below the space is condensed to form a mist. Since the water mist is formed with fine particles of the remaining fly ash serving as nuclei. Thus, there is formed an easily separable mist having a large weight and size.

The mist-containing flue gas from the second gas-liquid separating device 34 is fed a wet-type electric dust collector 35, where the condensed water mist and fly ash-containing condensed water mist are removed. The thus separated mist is washed away from electrode surfaces with the cooled second treating liquid (mist removing treating liquid) sprayed from the spray nozzle 59 and streaming downward through the device. The liquid containing the washed mist is then passed through the packed layer and is combined with the liquid contained in the bottom of the second gas-liquid contacting device.

The flue gas which has passed through the wet-type electric dust collector 35 is discharged through a line 44 to the air after being subjected to a treatment for the prevention of white smoke, if desired.

It is preferred that the second treating liquid have a pH of 4–6 for reasons of efficient capture and removal of $SO_2$ contained in the flue gas.

A part of the liquid contained in the bottom of the second gas-liquid contacting device 34 is recycled through a line 52, a pump and a line 53 to the first gas-liquid contacting device 33 for use as the first treating liquid.

A part of the fly ash-containing first treating liquid contained in the bottom of the first gas-liquid contacting device 33 is fed through a line 46 to the dioxin decomposing reactor 36, where it is stirred for a predetermined period of time for the decomposition and removal of dioxins deposited on the fly ash.

The treated liquid obtained in the dioxin decomposing reactor 36 is introduced through a line 47 and a pump into a solid-liquid separating device 37, where the fly ash contained therein is separated. The separated fly ash is discharged through a line 48. The separated water (exhaust water), on the other hand, is discharged through a line 49 and a pump. A portion of the separated water is recycled through lines 51 and 61 to the first and second gas-liquid contacting devices 33 and 34, with the remainder portion being discarded through a line 70 after being subjected to a suitable exhaust water treatment, if necessary.

The make-up treating liquid is introduced through line 60 to the line 51, if necessary.

Figure 11:
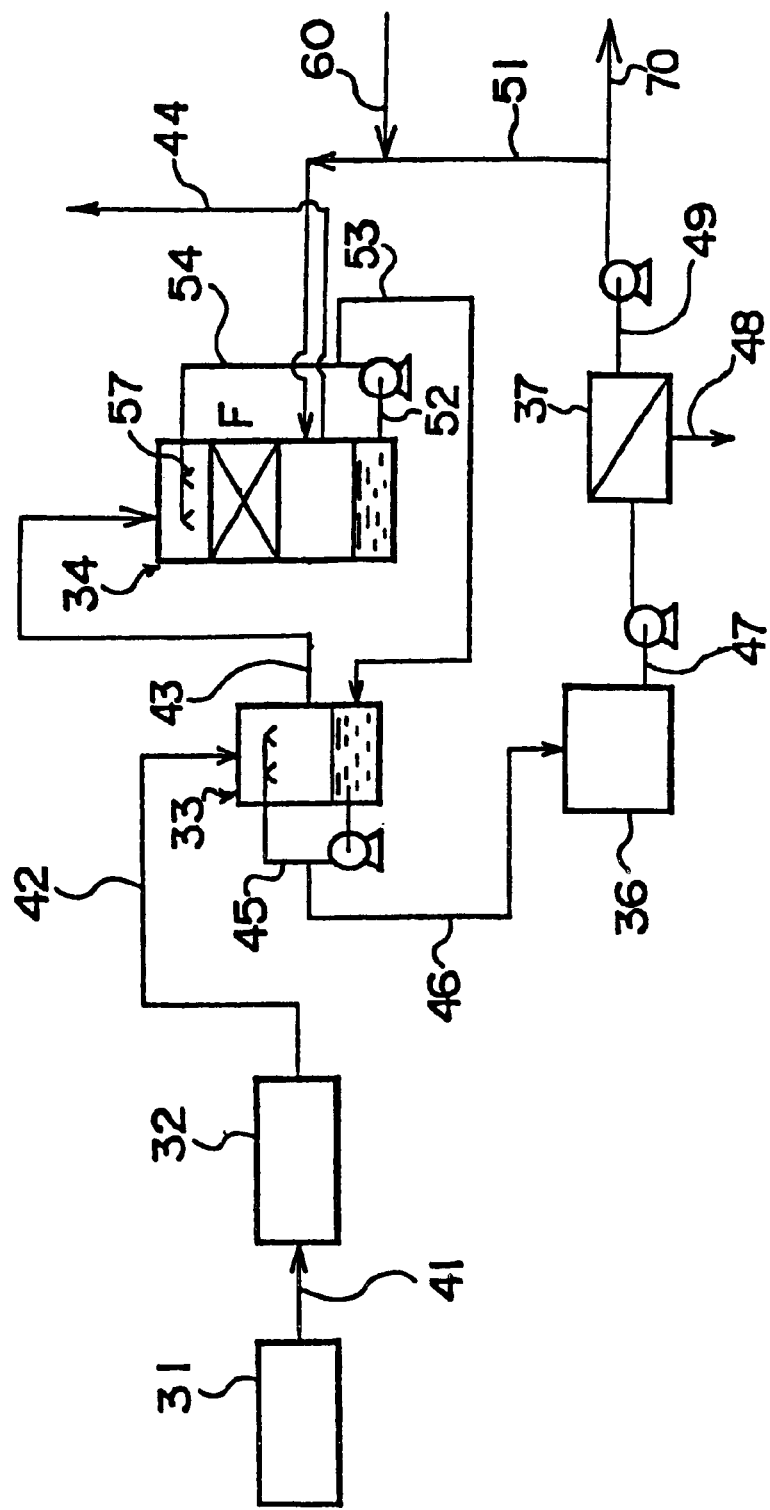
FIG. 11 is another example of a flow sheet showing a detailed embodiment of the flow sheet of FIG. 9 (in FIG. 11, the reference numeral 31 designates a combustion furnace, 32 a waste heat boiler, 33 a first gas-liquid contacting device, 34 a second gas-liquid contacting device, 36 a dioxin decomposing reactor and 37 designates a solid-liquid separating device)

In the treatment of a flue gas from a combustion furnace into a harmless state according to the flow sheet shown in FIG. 11, the flue gas containing dioxin-containing fly ash and generated in the combustion furnace 31 is introduced into a waste heat boiler 32 through a line 41 to recover the heat thereof and is then fed to a first gas-liquid contacting device 33 through a line 42. The flue gas introduced into the first gas-liquid contacting device 33 is contacted with fine liquid droplets of a first treating liquid fed through a line 45 and sprayed within the device and is rapidly cooled. At the same time, part of the fly ash and a greater part of HCl contained in the flue gas are captured by the first treating liquid and separated from the flue gas. The flue gas is cooled to 45–75° C., preferably 50–70° C. by the first gas-liquid contacting treatment. The treated flue gas which has been cooled and from which part of the fly ash and a greater part of HCl have been removed is fed through a line 43 to a second gas-liquid contacting device 34 where it is contacted with a second treating liquid. As a result of this contact, the fly ash and $SO_2$ remaining in the flue gas are captured by the second treating liquid and removed from the flue gas.

The first gas-liquid contacting device 33 shown in FIG. 11 has a liquid spray nozzle at an upper part of the tower. The first treating liquid contained in the bottom of the tower is fed through a line 45 and sprayed from the nozzle for contact with the gas. The structure of the device 33 is not limited to the above. For example, a structure in which the gas is blown through a nozzle into the liquid contained in a tank for performing the gas-liquid contact may be also adopted.

The second gas-liquid contacting device 34 shown in FIG. 11 has a packed layer formed therein. A liquid spray nozzle 57 is provided above the packed layer F.

In the first gas-liquid contacting device 33, an aqueous solution acidified with hydrochloric acid and containing a dioxin decomposing catalyst is contained in the bottom thereof as the first treating liquid. The aqueous solution is fed through a pump and a line 45 and sprayed from a top of the device, so that the device is filled with fine liquid droplets of the aqueous solution. The flue gas (having a temperature of generally 150–300° C.) introduced from the waste heat boiler 32 through a line 32 is contacted with the fine liquid droplets so that the fly ash and HCl contained in the flue gas are captured thereby and removed from the flue gas. The liquid droplets capturing the fly ash, etc. flow down through the device and is combined with the liquid in the bottom of the device. In the first gas-liquid contacting treatment, the pH of the first treating liquid used in the first gas-liquid contacting device is adjusted to 2–4 so that HCl contained in the flue gas can be efficiently captured and separated by the treating liquid.

As a result of the first gas-liquid contacting treatment, 30–95%, preferably 80–95% of the fly ash contained in the flue gas is captured and removed by the first treating liquid. Further, at least 90%, preferably at least 95% of HCl contained in the flue gas is captured and removed by the first treating liquid.

A part of the exhaust water obtained in the solid-liquid separating device 37 is recycled through a line 51 to the second gas-liquid contacting device 34 as the second treating liquid. The recycled liquid is fed to a lower part of the device 34 and is combined with the liquid contained in the bottom of the device. The liquid contained in the bottom of the device is fed through a line 52, a pump and a line 54 and sprayed through a liquid spray nozzle 57.

In the second gas-liquid contacting step 34, the second treating liquid flows downward through the packed layer F and is contacted with the upwardly flowing flue gas, so that the fly ash remaining in the flue gas is captured by the downwardly flowing treating liquid. The treating liquid capturing the fly ash flows down through the packed layer F and is combined with the liquid contained in the bottom of the device. The $SO_2$ contained in the flue gas, on the other hand, is adsorbed on activated carbon and is converted into sulfuric acid by the catalytic oxidation and removed. The sulfuric acid thus formed absorbs water contained in the flue gas to form dilute sulfuric acid which is liberated from the activated carbon, flowed down through the packed layer of the activated carbon and combined with the liquid contained in the bottom of the device.

The flue gas which has passed through the second gas-liquid contacting device 34 is discharged through a line 44 to the air after being subjected to a treatment for the prevention of white smoke, if desired.

It is preferred that the second treating liquid have a pH of 2–6 for reasons of efficient capture and removal of $SO_2$ contained in the flue gas.

A part of the liquid contained in the bottom of the second gas-liquid contacting device 34 is recycled through a line 52, a pump and a line 53 to the first gas-liquid contacting device 33 for use as the first treating liquid.

A part of the fly ash-containing first treating liquid contained in the bottom of the first gas-liquid contacting device 33 is fed through lines 45 and 46 to the dioxin decomposing reactor 36, where it is stirred for a predetermined period of time for the decomposition and removal of dioxins deposited on the fly ash.

The treated liquid obtained in the dioxin decomposing reactor 36 is introduced through a line 47 and a pump into a solid-liquid separating device 37, where the fly ash contained therein is separated. The separated fly ash is discharged through a line 48. The separated water (exhaust water), on the other hand, is discharged through a line 49 and a pump. A portion of the separated water is recycled through a line 51 to the second gas-liquid contacting device 34, with the remainder portion being discarded through a line 70 after being subjected to a suitable exhaust water treatment, if necessary. The make-up treating liquid is introduced through line 60 to the line 51, if necessary.

Figure 12:
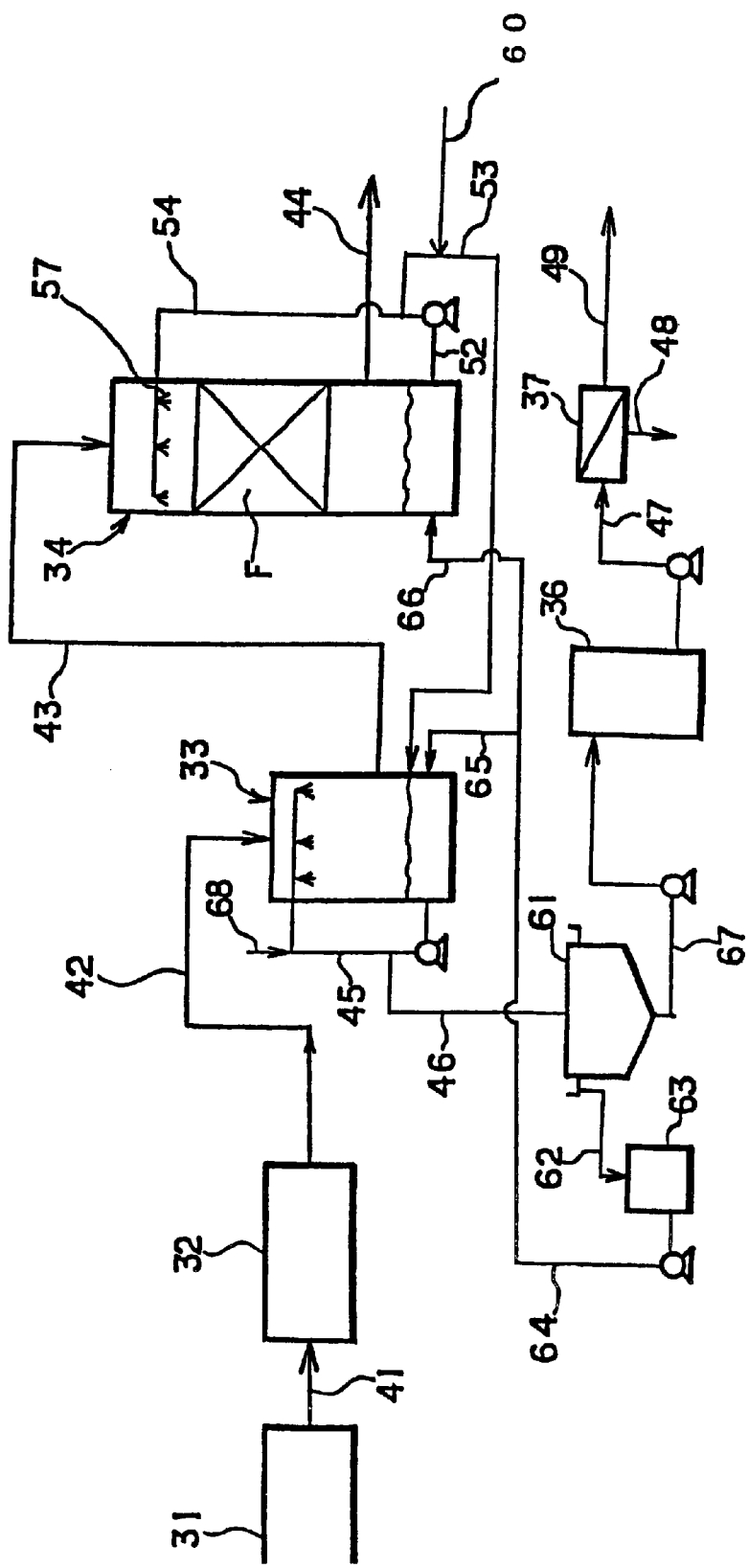
FIG. 12 is a further example of a flow sheet showing a detailed embodiment of the flow sheet of FIG. 9 (in FIG. 12, the reference numerals similar to those in FIG. 11 designate the same component parts)

In the treatment of a flue gas from a combustion furnace into a harmless state according to the flow sheet shown in FIG. 12, the flue gas containing dioxin-containing fly ash and generated in the combustion furnace 31 is introduced into a waste heat boiler 32 through a line 41 to recover the heat thereof and is then fed to a first gas-liquid contacting device 33 through a line 42. The flue gas introduced into the first gas-liquid contacting device 33 is contacted with fine liquid droplets of a first treating liquid fed through a line 45 and sprayed within the device and is rapidly cooled. At the same time, part of the fly ash and a greater part of HCl contained in the flue gas are captured by the first treating liquid and separated from the flue gas. The flue gas is cooled to 45–75° C., preferably 50–70° C. by the first gas-liquid contacting treatment. The treated flue gas which has been cooled and from which part of the fly ash and a greater part of HCl have been removed is fed through a line 43 to a second gas-liquid contacting device 34 where it is contacted with a second treating liquid. As a result of this contact, the fly ash and $SO_2$ remaining in the flue gas are captured by the second treating liquid and removed from the flue gas.

The first gas-liquid contacting device 33 shown in FIG. 12 has a liquid spray nozzle at an upper part of the tower. The first treating liquid contained in the bottom of the tower is fed through a line 45 and sprayed from the nozzle for contact with the gas. The structure of the device 33 is not limited to the above. For example, a structure in which the gas is blown through a nozzle into the liquid contained in a tank for performing the gas-liquid contact may be also adopted.

The second gas-liquid contacting device 34 shown in FIG. 12 has a packed layer F formed therein. A liquid spray nozzle 57 is provided above the packed layer F.

In the first gas-liquid contacting device 33, an aqueous solution acidified with hydrochloric acid and containing a dioxin decomposing catalyst is contained in the bottom thereof as the first treating liquid. The aqueous solution is fed through a pump and a line 45 and sprayed from a top of the device, so that the device is filled with fine liquid droplets of the aqueous solution. The flue gas (having a temperature of generally 150–300° C.) introduced from the waste heat boiler 32 through a line 32 is contacted with the fine liquid droplets so that the fly ash and HCl contained in the flue gas are captured thereby and removed from the flue gas. The liquid droplets capturing the fly ash, etc. flow down through the device and is combined with the liquid in the bottom of the device. In the first gas-liquid contacting treatment, the pH of the first treating liquid used in the first gas-liquid contacting device is adjusted to 2–4 so that HCl contained in the flue gas can be efficiently captured and separated by the treating liquid.

As a result of the first gas-liquid contacting treatment, 30–95%, preferably 80–95% of the fly ash contained in the flue gas is captured and removed by the first treating liquid. Further, at least 90%, preferably at least 95% of HCl contained in the flue gas is captured and removed by the first treating liquid.

A low fly ash concentration aqueous solution obtained in a thickener 61 is recycled through a reservoir 63 and lines 64 and 66 to the second gas-liquid contacting device 34 as the second treating liquid. The recycled liquid is fed to a lower part of the device 34 and is combined with the liquid contained in the bottom of the device. The liquid contained in the bottom of the device is fed through a line 52, a pump and a line 54 and sprayed through a liquid spray nozzle 57.

In the second gas-liquid contacting step 34, the second treating liquid flows downward through the packed layer F and is contacted with the upwardly flowing flue gas, so that the fly ash remaining in the flue gas is captured by the downwardly flowing treating liquid. The treating liquid capturing the fly ash flows down through the packed layer F and is combined with the liquid contained in the bottom of the device. The $SO_2$ contained in the flue gas is adsorbed on activated carbon and is converted into sulfuric acid by the catalytic oxidation and removed. The sulfuric acid thus formed absorbs water contained in the flue gas to form dilute sulfuric acid which is liberated from the activated carbon, flowed down through the packed layer of the activated carbon and combined with the liquid contained in the bottom of the device.

The flue gas which has passed through the second gas-liquid contacting device 34 is discharged through a line 44 to the air after being subjected to a treatment for the prevention of white smoke, if desired.

It is preferred that the second treating liquid have a pH of 2–6 for reasons of efficient capture and removal of $SO_2$ contained in the flue gas.

A part of the liquid contained in the bottom of the second gas-liquid contacting device 34 is recycled through a line 52, a pump and a line 53 to the first gas-liquid contacting device 33 for use as the first treating liquid.

A part of the fly ash-containing first treating liquid contained in the bottom of the first gas-liquid contacting device 33 is fed through lines 45 and 46 to a concentration device (thickener) 61.

The thickener 61 serves to function as a concentrating device for increasing the concentration of the fly ash in the fly ash-containing aqueous solution obtained in the first gas-liquid contacting device 33. In the thickener 61, the fly ash in the aqueous solution falls by the gravity so that the fly ash concentration in a surface portion of the aqueous solution is lowered while the fly ash concentration in a bottom portion is increased. The aqueous solution having an increased fly ash concentration (fly ash-concentrated liquid) is fed through a line 67 and a pump to a dioxin decomposing reactor 36.

The aqueous solution having a low fly ash concentration, on the other hand, is fed to a reservoir 63 and is recycled through a pump and lines 64 and 66 to the second gas-liquid contacting device 34 as the second treating liquid. A portion of the low fly ash aqueous solution in the line 64 may be fed through a line 65 to the first gas-liquid contacting device 33.

The fly ash concentration rate in the thickener 61 is 2–60 times, preferably 3–50 times. It is preferred that the fly ash-concentrated liquid discharged from the thickener 61 have a fly ash concentration of at least 1% by weight. The upper limit of the concentration is not specifically limited but is generally about 30% by weight. The low fly ash aqueous solution discharged from the thickener 7 and having a reduced fly ash concentration has a fly ash concentration of not greater than 0.5% by weight, preferably not greater than 0.1% by weight.

By concentrating the fly ash-containing aqueous solution in the thickener 61 and by introducing the fly ash-concentrated liquid to the dioxin decomposing reactor 36, it is possible to make the reactor 36 compact and to increase the efficiency thereof. In order to increase the decomposition efficiency in decomposing dioxins in the reactor 36 into harmless substances, it is necessary to increase the residence time (reaction time) of the fly ash in the device 36 as long as possible. In this case, when the fly ash concentration in the aqueous solution is low, it is necessary to increase the volume of the reactor in correspondence to an increased residence time.

In the case of the present invention, since the fly ash-containing aqueous solution fed to the reactor 36 has high fly ash concentration, the amount of fly ash per unit volume of the reactor is large so that the reactor may be made compact.

The low fly ash aqueous solution having a reduced fly ash concentration and obtained in the thickener 61 is suited for use as a cooling liquid for the first gas-liquid contacting device 33 and as the treating liquid for the second gas-liquid contacting device 34. Namely, because of the low fly ash content and of fineness of the particle size of the fly ash, the aqueous solution does not cause troubles by friction and clogging in passage thereof through pumps, pipes and nozzles and can be handled in the same manner as the ordinary industrial water.

In the dioxin decomposing reactor 36, dioxins contained in the fly ash are decomposed and removed.

The treated liquid obtained in the dioxin decomposing reactor 36 is introduced through a line 47 into a solid-liquid separating device 37, where the fly ash contained therein is separated. The separated fly ash is discharged through a line 48. The separated water (exhaust water), on the other hand, is discharged through a line 49 and discarded after being subjected to a suitable exhaust water treatment, if necessary. The make-up treating liquid is introduced through line 60 to the second gas-liquid contacting device 34, if necessary.

The present invention will be further described in detail by examples.

EXAMPLE 1

Dioxins contained in a fly ash having the properties shown below and separated from a flue gas generated from a combustion furnace were treated into harmless substances in a manner shown below.

Properties of Fly Ash

| | |
|---|---|
| (i) Content of carbonaceous materials: | 0.1 wt. % |
| (ii) Content of copper: | 0.35 wt. % |
| (iii) Content of dioxins: | 3.6 ng-TEQ/g |

Treating Method

The fly ash (400 g) was added to 2 liters of purified water, to which hydrochloric acid was added with stirring and heating. The mixture was then maintained at 65° C. and a pH of 3.5 for 48 hours. The aqueous solution had a Cl concentration of 1,900 mmol/liter, a molar ratio [Cl]/[SO$_4$] of 113 and a Cu concentration of 500 mg/liter. After the 48 hour-stirring, the thus formed slurry was filtered to collect the treated fly ash and to analyze dioxins. A dioxin decomposition rate was calculated according to the following formula and to reveal that the decomposition rate was 92%.

$$R=[(a_0 \times C_0)-(a \times c)]/a_0 c_0 \times 100 \quad (1)$$

R: DXN (dioxins) decomposition rate (%)
$a_0$: Weight of untreated fly ash, dry basis (g)
a: Weight of treated fly ash, dry basis (g)
$c_0$: DXN concentration of untreated fly ash (ng-TEQ/g)
c: DXN concentration of treated fly ash (ng-TEQ/g)

EXAMPLE 2

An experiment was carried out in the same manner as that in Example 1 except that the pH adjustment was performed with sulfuric acid. The Cl/SO$_4$ molar ratio was 19. The dioxin decomposition rate was 61%.

EXAMPLE 3

An experiment was carried out in the same manner as that in Example 1 except that the reaction time was changed. The dioxin decomposition rate was 65% at a reaction time of 20 hours and 92% at a reaction time of 48 hours.

EXAMPLE 4

Dioxins contained in a fly ash having the properties shown below and separated from a flue gas from a combustion furnace were treated into a harmless state in a manner shown below.

Properties of Fly Ash:

| | |
|---|---|
| (i) Content of carbonaceous materials: | 3.0 wt. % |
| (ii) Content of copper: | 0.17 wt. % |
| (iii) Content of dioxins: | 17.4 ng-TEQ/g |

Treating Method:

The fly ash (400 g) was added to 4 liters of purified water containing 10 wt % of methanol as a contact-accelerating agent, to which hydrochloric acid was added with stirring and heating. The mixture was then maintained at 65° C. and a pH of 3.5 for 48 hours. The aqueous solution had a Cl concentration of 480 mmol/liter, a molar ratio [Cl]/[SO$_4$] of 29 and a Cu concentration of 100 mg/liter. After the 48 hour-stirring, the thus formed slurry was filtered to collect the treated fly ash and to analyze dioxins. A dioxin decomposition rate was calculated to reveal that the decomposition rate was 70%.

EXAMPLE 5

An experiment was carried out in the same manner as that in Example 4 except that the aqueous solution was irradiated with an ultrasonic wave. The dioxin decomposition rate was 83%. An ultrasonic wave treating device (UP-50H manufactured by Kubota Shoji Inc.) was used for generating the ultrasonic wave.

EXAMPLE 6

An experiment was carried out in the same manner as that in Example 4 except that 8 g of a sulfosuccinate-type anionic surfactant and 4 g of an ether-type nonionic surfactant were substituted for the methanol. The dioxin decomposition rate was 67%.

EXAMPLE 7

Figure 13:
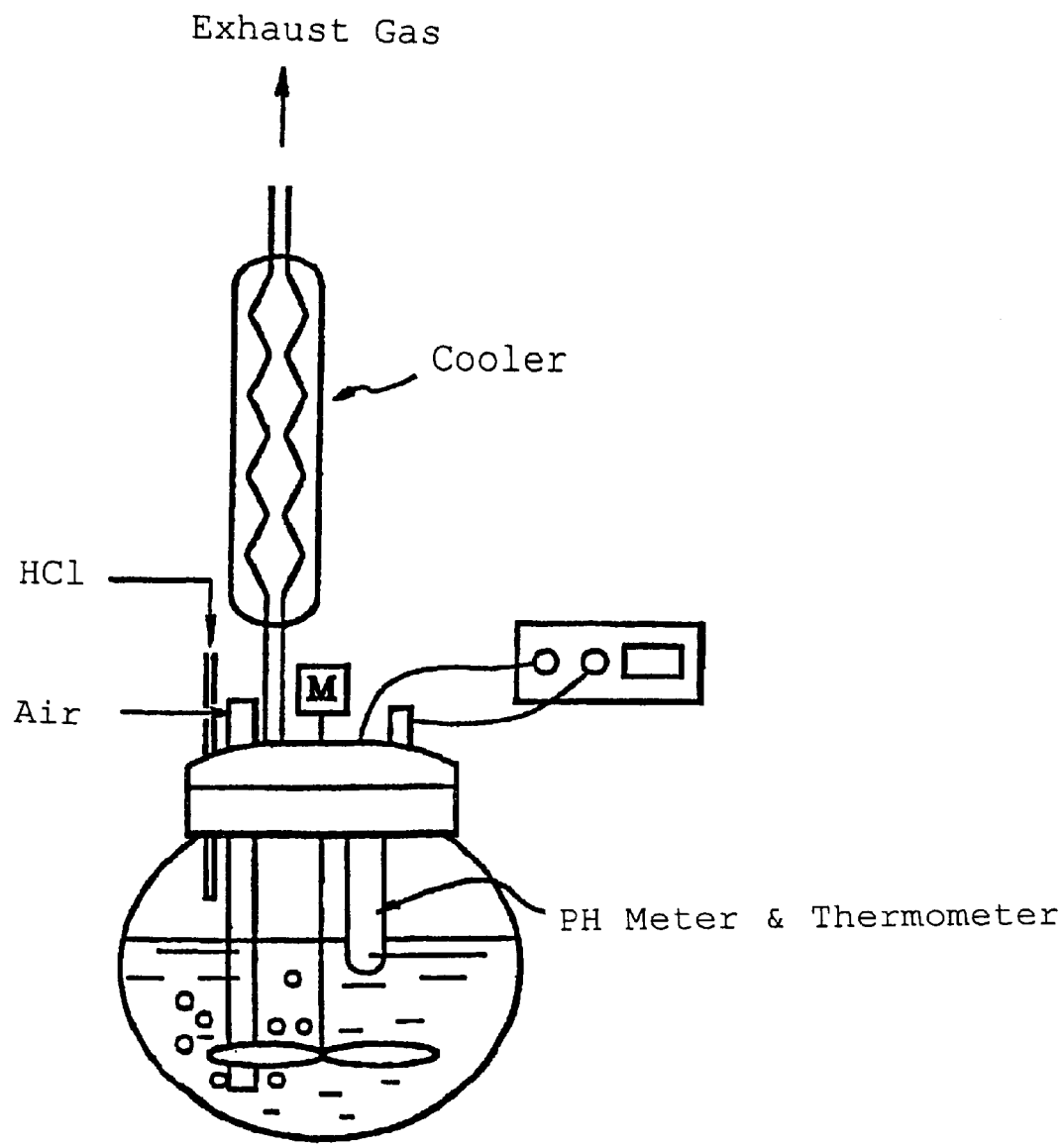
FIG. 13 shows an experiment device used in a decomposition test for dioxins.

An experiment of decomposition of dioxins contained in a fly ash was carried out using an apparatus shown in FIG. 13 in the manner and under the conditions shown below.

Treatment Procedure and Conditions:

1. In a flask shown in FIG. 13, 2.0 liters of purified water containing 100 mg/liter of each of Fe, Mn, Mo, Cu, Zn, Cr and V (each dissolved as a chloride) were charged, to which a small amount of hydrochloric acid was added. The mixture was heated with stirring and maintained at a pH of 3.5 and a temperature of 65° C.

2. Then, 400 g of fly ash as used in Example 1 were added to the above solution. The mixture was then maintained at a pH of 3.5 by addition of hydrochloric acid with stirring at 65° C. for 48 hours while bubbling air at 50 N liter/hour.

3. After the 48 hours stirring, the slurry was filtered to obtain a treating liquid and a treated fly ash.

4. The raw material fly ash, the treating liquid, the treated fly ash and an exhaust gas discharged overhead from a condenser mounted on the flask were analyzed for dioxins.

Results of Treatment:

(1) The weight change of the fly ash before and after the wet processing is as shown in Table 1 below. Thus, the weight of 400 g before the treatment decreased to 150 g (37.5% of the weight before the treatment). The decrease is considered to be attributed to the dissolution of soluble salts such as NaCl.

TABLE 1

Weight change of fly ash before and after the wet processing (unit: g (dry base))

|  | Before treatment | After treatment |
|---|---|---|
| Weight of fly ash | 400 | 150 |

(2) The concentrations of the dioxins in the fly ash before and after the above wet porcessing were as shown in Table 2. The concentrations in the fly ash after the treatment were significantly lower as a whole than those before the treatment. The acronyms in Tables 2 and 3 mean as follows:

T4CDDs: tetrachlorodibenzo-p-dioxins
p5CDDs. pentachlorodibenzo-p-dioxins
H6CDDs: hexachlorodibenzo-p-dioxins
H7CDDs: heptachlorodibenzo-p-dioxins
O8CDDs: octachlorodibenzo-p-dioxins
Total PCCDs: total polychlorodibenzo-p-dioxins
T4CDFs: tetrachlorodibenzofuran
P5CDFs: pentachlorodibenzofuran
H6CDFs: hexachlorodibenzofuran
H7CDFs: heptachlorodibenzofuran
O8CDFs: octachlorodibenzofuran
Total PCDFs: total polychlorodibenzofuran
Total: Total dioxins

TABLE 2

Concentrations of dioxins in fly ash before and after the wet processing (unit: ng-TEQ/g)

|  |  | Before treatment (raw material fly ash) | After treatment (treated fly ash) |
|---|---|---|---|
| Dioxin | T4CDDs | 0.064 | 0.013 |
|  | P5CDDs | 0.27 | 0.041 |
|  | H6CDDS | 0.35 | 0.098 |
|  | H7CDDs | 0.13 | 0.054 |
|  | O8CDDs | 0.033 | 0.019 |
|  | Total PCDDs | 0.85 | 0.23 |
| Dibenzo-furan | T4CDFs | 0.04 | 0.0089 |
|  | P5CDFs | 0.90 | 0.25 |
|  | H6CDFs | 1.0 | 0.42 |
|  | H7CDFs | 0.22 | 0.15 |
|  | O8CDFs | 0.0082 | 0.0076 |
|  | Total PCDFs | 2.2 | 0.83 |
|  | Total | 3.1 | 1.1 |

(3) The removal rate (decomposition rate) of dioxins is shown in Table 3. The removal rate was calculated according to the formula (1) above, bearing mind that the weight of the fly ash after the treatment was 37.5% of the original weight. Since the amount of dioxins contained in the exhaust gas and the treating liquid was ignorable from the standpoint of mass balance, the removal rate was calculated only from the analyzed values of dioxin concentrations in the fly ash.

TABLE 3

Removal Rate of Dioxins (unit: %)

|  |  | Removal Rate |
|---|---|---|
| Dioxin | T4CDDs | 92 |
|  | P5CDDs | 94 |
|  | H6CDDs | 89 |
|  | H7CDDs | 84 |
|  | O8CDDs | 78 |
|  | Total PCDDs | 90 |
| Dibenzo-furan | T4CDFs | 92 |
|  | P5CDFs | 90 |
|  | H6CDFs | 84 |
|  | H7CDFs | 75 |
|  | O8CDFs | 65 |
|  | Total PCDFs | 86 |
|  | Total | 87 |

EXAMPLE 8

Fly ash separated and recovered from a flue gas generated from a combustion furnace was treated into a harmless state according to the flow sheet shown in FIG. 7. The main operation conditions were as shown below with reference to FIG. 7.

Method of Experiment

To the fly ash slurry preparation vessel 60 shown in FIG. 7 were fed a thickener supernatant through the line 21, industrial water through the line 61, hydrochloric acid and sulfuric acid (molar ratio: 7:1, simulation of acidic gas removed from flue gas) through the line 62 and 50 g/h of fly ash through the line 63. While stirring the mixture, magnesium hydroxide was added through the line 64 to form a slurry having a pH of 3.5. The residence time of the liquid in the slurry preparation vessel 60 was simulation of the residence times of the cooling tower 3 and the gas-liquid contacting device 4 shown in FIG. 4.

(1) Line 63
   Amount of fly ash: 50 g/h
   Concentration of dioxins in fly ash: 1.0 ng-TEQ/g (2) Line 28
   Temperature: 65° C.
   Properties of discharged liquid:
     Cl ion concentration: 36,200 ppm-w (ppm-w: concentration on weight basis)
     Cu ion concentration: 120 ppm-w
     Cl/SO$_4$ molar ratio: 100
     PH: 3.5
     Fly ash concentration: 0.5% by weight
   Discharge rate: 4,900 g/h (3) Line 27
   Temperature: 65° C.
   Fly ash concentration: 0.1% by weight
   Overflowing rate: 3,500 g/h (4) Line 29
   Temperature: 65° C.
   Fly ash concentration: 1.5% by weight
   Concentration of dioxins in fly ash: 1.8 ng-TEQ/g
   Discharge rate: 1,400 g/h (5) Dioxin decomposition reactor 8
   Temperature: 65° C.
   Properties of discharged liquid:
     Cl ion concentration: 36,200 ppm-w
     Cu ion concentration: 120 ppm-w
     Cl/SO$_4$ molar ratio: 100
     PH: 3.5
     Fly ash concentration: 1.5% by weight
   Residence time: 48 hours (6) Line 31
   Temperature: 65° C.
   Fly ash concentration: 1.5% by weight
   Concentration of dioxins in fly ash: 0.26 ng-TEQ/g
   Dioxin decomposition rate: 89%

(7) Line 32
   Amount of fly ash: 21 g/h
   Concentration of dioxins in fly ash: 0.26 ng-TEQ/g
   Dioxin decomposition rate: 89%

EXAMPLE 9

Fly ash separated and recovered from a flue gas from a combustion furnace was treated into a harmless state according to the flow sheet shown in FIG. 8. The main operation conditions were as shown below with reference to FIG. 8.

Method of Experiment

To the fly ash slurry preparation vessel 60 shown in FIG. 8 were fed a thickener supernatant through the line 21, industrial water through the line 61, hydrochloric acid and sulfuric acid (molar ratio: 7:1, simulation of acidic gas removed from flue gas) through the line 62 and 50 g/h of fly ash through the line 63. While stirring the mixture, magnesium hydroxide was added through the line 64 to form a slurry having a pH of 3.5. The residence time of the liquid in the slurry preparation vessel 60 was simulation of the residence times of the cooling tower 3 and the gas-liquid contacting device 4 shown in FIG. 5. The concentrating device 10 used an electric heater.

(1) Line 63
   Amount of fly ash: 50 g/h
   Concentration of dioxins in fly ash: 1.0 ng-TEQ/g (2) Line 28
   Temperature: 65° C.
   Properties of discharged liquid:
     Cl ion concentration: 36,200 ppm-w (ppm-w: concentration on weight basis)
     Cu ion concentration: 120 ppm-w
     Cl/SO$_4$ molar ratio: 100
     PH: 3.5
     Fly ash concentration: 0.5% by weight Discharge rate: 4,900 g/h (3) Line 27
   Temperature: 65° C.
   Fly ash concentration: 0.1% by weight
   Overflowing rate: 3,500 g/h (4) Line 29
   Temperature: 65° C.
   Fly ash concentration: 1.5% by weight
   Concentration of dioxins in fly ash: 1.8 ng-TEQ/g
   Discharge rate: 1,400 g/h (5) Dioxin decomposition reactor 8
   Temperature: 65° C.
   Properties of discharged liquid:
     Cl ion concentration: 60,000 ppm-w
     Cu ion concentration: 200 ppm-w
     Cl/SO$_4$ molar ratio: 160
     PH: 3.5
     Fly ash concentration: 1.1% by weight
   Residence time: 35 hours (6) Line 31
   Temperature: 65° C.
   Fly ash concentration: 1.1% by weight
   Concentration of dioxins in fly ash: 0.21 ng-TEQ/g
   Dioxin decomposition rate: 91%
   Amount of liquid treated: 1,945 g/h (7) Line 32
   Amount of fly ash: 21 g/h
   Concentration of dioxins in fly ash: 0.21 ng-TEQ/g
   Dioxin decomposition rate: 91%

(8) Line 40
   Properties of concentrated liquid:
     Cl ion concentration: 120,000 ppm-w
     Cu ion concentration: 400 ppm-w
   Amount of concentrated liquid: 960 g/h (9) Line 39
   Amount of condensed water: 964 g/h

(10) Line 44
   Amount of recycled liquid: 545 g/h

(11) Line 41
   Amount of discharged liquid: 415 g/h

EXAMPLE 10

Fly ash was treated into a harmless state according to the flow sheet shown in FIG. 7. In this method, concentration with the thickener was carried out so that the fly ash concentration became 4% by weight. However, since the size of the reactor for decomposition of dioxins was reduced to about 1/2.5 of the reactor used in Example 8, the residence time was the same as in Example 8.
(1) Line 63
  Amount of fly ash: 50 g/h
  Concentration of dioxins in fly ash: 1.0 ng-TEQ/g
(2) Line 28
  Temperature: 65° C.
  Properties of discharged liquid:
    Cl ion concentration: 99,000 ppm-w
    (ppm-w: concentration on weight basis)
    Cu ion concentration: 330 ppm-w
    $Cl/SO_4$ molar ratio: 250
    PH: 3.5
    Fly ash concentration: 0.5% by weight
  Discharge rate: 5,120 g/h
(3) Line 27
  Temperature: 65° C.
  Fly ash concentration: 0.1% by weight
  Overflowing rate: 4,595 g/h
(4) Line 29
  Temperature: 65° C.
  Fly ash concentration: 4.0% by weight
  Concentration of dioxins in fly ash: 1.7 ng-TEQ/g
  Discharge rate: 525 g/h
(5) Dioxin decomposition reactor 8
  Temperature: 65° C.
  Properties of discharged liquid:
    Cl ion concentration: 99,000 ppm-w
    Cu ion concentration: 330 ppm-w
    $Cl/SO_4$ molar ratio: 250
    PH: 3.5
    Fly ash concentration: 4.0% by weight
  Residence time: 48 hours
(6) Line 31
  Temperature: 65° C.
  Fly ash concentration: 4.0% by weight
  Concentration of dioxins in fly ash: 0.13 ng-TEQ/g
  Dioxin decomposition rate: 95%
(7) Line 32
  Amount of fly ash: 21 g/h
  Concentration of dioxins in fly ash: 0.13 ng-TEQ/g
  Dioxin decomposition rate: 95%

EXAMPLE 11

Fly ash was treated into a harmless state according to the flow sheet shown in FIG. 6. The main operation conditions were as shown below with reference to FIG. 6. Since the preparation of fly ash slurry was the same as that in Example 8, description is omitted here. In this method, the concentration with the thickener was carried out so that the fly ash concentration became 10% by weight. However, since the size of the reactor for decomposition of dioxins was reduced to about 1/6 of the reactor used in Example 8, the residence time was the same as in Example 8.
(1) Line 28
  Temperature: 65° C.
  Properties of discharged liquid:
    Cl ion concentration: 50,000 ppm-w
    Cu ion concentration: 170 ppm-w
    $Cl/SO_4$ molar ratio: 140
    PH: 3.5
    Fly ash concentration: 0.5% by weight
  Discharge rate: 5,195 g/h
(2) Line 27
  Temperature: 65° C.
  Fly ash concentration: 0.1% by weight
  Overflowing rate: 4,985 g/h
(3) Line 29
  Temperature: 65° C.
  Fly ash concentration: 10% by weight
  Concentration of dioxins in fly ash: 1.8 ng-TEQ/g
  Discharge rate: 210 g/h
(4) Dioxin decomposition reactor 8
  Temperature: 65° C.
  Properties of discharged liquid:
    Cl ion concentration: 50,000 ppm-w
    Cu ion concentration: 170 ppm-w
    $Cl/SO_4$ molar ratio: 140
    PH: 3.5
    Fly ash concentration: 10% by weight
  Residence time: 48 hours
(5) Line 31
  Temperature: 65° C.
  Fly ash concentration: 10% by weight
  Concentration of dioxins in fly ash: 0.22 ng-TEQ/g
  Dioxin decomposition rate: 91%
(6) Line 32
  Amount of fly ash: 21 g/h
  Concentration of dioxins in fly ash: 0.22 ng-TEQ/g
  Dioxin decomposition rate: 91%
(7) Line 57
  Properties of discharged liquid:
    Cl ion concentration: 50,000 ppm-w
    Cu ion concentration: 170 ppm-w
    Amount of discharged liquid: 810 g/h
(8) Line 58
  Temperature: 65° C.
  Fly ash concentration: 0.1% by weight

COMPARATIVE EXAMPLE

In Example 8, the slurry having a fly ash concentration of 0.5% by weight was fed to the dioxin decomposing reactor 8 without using the thickener. The results are shown below.
(1) Liquid feed to dioxin decomposing reactor (Line 29)
  Temperature: 65° C.
  Properties of discharged liquid:
    Cl ion concentration: 11,900 ppm-w
    Cu ion concentration: 40 ppm-w
    $Cl/SO_4$ molar ratio: 33
    PH: 3.5
    Fly ash concentration: 0.5% by weight
    Concentration of dioxins in fly ash: 2.1 ng-TEQ/g
  Liquid feed rate: 4,200 g/h
(2) Dioxin decomposition reactor 8
  Temperature: 65° C.
  Properties of discharged liquid:
    Cl ion concentration: 11,900 ppm-w
    Cu ion concentration: 40 ppm-w
    $Cl/SO_4$ molar ratio: 33
    PH: 3.5
    Fly ash concentration: 0.5% by weight Residence time: 16 hours (3) Liquid in outlet of dioxin decomposing reactor (Line 31)
  Temperature: 65° C.
  Fly ash concentration: 0.5% by weight
  Concentration of dioxins in fly ash: 1.4 ng-TEQ/g
  Dioxin decomposition rate: 41%
(4) Line 32
  Amount of fly ash: 21 g/h
  Concentration of dioxins in fly ash: 1.4 ng-TEQ/g
  Dioxin decomposition rate: 41%

EXAMPLE 12

Flue gas from a combustion furnace was treated into a harmless state according to the flow sheet shown in FIG. 12. Within the second gas-liquid contacting device, a packed layer containing activated carbon honeycomb prepared from a mixture of coal-type activated carbon with tetrafluorocarbon dispersion (tetrafluoroethylene content* 10% by weight) was disposed. The main operation conditions were as shown below with reference to FIG. 12. The data in this example were based on results obtained in respective small-scale experiments.

(1) Line 42
  Temperature: 250° C.
  Amount of gas: 15,000 Nm³/h (dry basis)
  Concentration of hydrochloric acid in gas: 580 ppm
  Concentration of $SO_2$ in gas: 100 ppm
  Amount of fly ash in gas: 19,000 g/h
  Concentration of fly ash in gas: 1.27 g/Nm³
  Concentration of dioxins in fly ash: 1.0 ng-TEQ/g
  Total dioxin concentration in gas: 1.33 ng-TEQ/ Nm³
(2) First gas liquid contacting device 33
  Cooling temperature: 70° C.
(3) Line 43
  Temperature: 70° C.
  Concentration of hydrochloric acid in gas: 10 ppm
  Concentration of $SO_2$ in gas: 80 ppm
  Amount of fly ash in gas: 1,900 g/h
(4) Line 44
  Temperature: 70° C.
  Concentration of hydrochloric acid in gas: 0 ppm
  Concentration of $SO_2$ in gas: 7 ppm
  Amount of fly ash in gas: 200 g/h
  Total dioxin concentration in gas: 0.023 ng-TEQ/ Nm³
  Total dioxin removing rate in gas: 98.3%
(5) Line 54
  Temperature of second treating liquid: 70° C.
(6) Line 46
  Temperature: 70° C.
  Fly ash concentration: 0.5% by weight
(7) Line 62
  Temperature: 70° C.
  Fly ash concentration: 0.1% by weight
(8) Line 67
  Temperature: 70° C.
  Properties of discharged liquid:
    Cl ion concentration: 99,000 ppm-w (ppm-w: concentration on weight basis)
    Cu ion concentration: 330 ppm-w
    Cl/$SO_4$ molar ratio: 250
    PH: 3.5
  Fly ash concentration: 4% by weight
  Concentration of dioxins in fly ash: 1.8 ng-TEQ/g
(9) Dioxin decomposing reactor 36
  Temperature: 70° C.
  Properties of discharged liquid:
    Cl ion concentration: 99,000 ppm-w
    Cu ion concentration: 330 ppm-w
    Cl/$SO_4$ molar ratio: 250
    PH: 3.5
  Fly ash concentration: 4% by weight
  Residence time: 48 hours
(10) Line 47
  Temperature: 70° C.
  Fly ash concentration: 4%,by weight
  Concentration of dioxins in fly ash: 0.14 ng-TEQ/g
(11) Line 48
  Amount of fly ash: 8.0 kg/h
  Concentration of dioxins in fly ash: 0.14 ng-TEQ/g
  Dioxin decomposing rate in fly ash: 94%
(12) Line 49
  Concentration of dioxins in waste water: 0.001 ng-TEQ/ kg
  Decomposing rate of total dioxins removed: 94%

According to the present invention, dioxins in fly ash contained in a flue gas from a combustion furnace can be decomposed into a harmless state with a high efficiency and at low costs.

What is claimed is:

1. A process for the wet decomposition of dioxins into harmless substances, characterized in that the dioxins are contacted with an aqueous solution, acidified with hydrochloric acid and containing a catalyst dissolved therein, at a temperature lower than 100° C. to decompose the dioxins into harmless substances with a decomposition rate of at least 60%.

2. A process according to claim 1, wherein said aqueous solution contains a contact-accelerating agent.

3. A process according to claim 1, wherein said aqueous solution is irradiated with an ultra sonic wave.

4. process according to claim 1 wherein said catalyst includes a metal ion capable of assuming low valency and high valency states.

5. A process according to claim 1 wherein said catalyst is a copper ion or an iron ion.

6. A process according to claim 1 wherein said catalyst contains an undissolved matter which is in the course of being converted into a dissolved state.

7. A process according to claim 1, wherein said aqueous solution is contacted with oxygen or an oxygen-containing gas.

8. A process for the wet processing of a flue gas generated from a combustion furnace and containing a dioxin-containing fly ash into a harmless substance, characterized in that said flue gas is contacted with an aqueous solution, acidified with hydrochloric acid and containing a catalyst dissolved therein, at a temperature lower than 100° C. to cause the fly ash contained in said flue gas to migrate into said aqueous solution and to decompose the dioxins deposited on the fly ash into a harmless substance with a decomposition rate of at least 60%.

9. A process for the wet processing of a flue gas generated from a combustion furnace and containing a dioxin-containing fly ash into a harmless substance, characterized in that said process comprises (i) a gas-liquid contacting step of bringing said flue gas cooled to a temperature lower than 100° C. into gas-liquid contact with an aqueous solution acidified with hydrochloric acid, (ii) a fly ash concentrating step of increasing a fly ash content of the aqueous solution obtained in said gas-liquid contacting step and containing fly ash, and (iii) a dioxin decomposing step of maintaining said aqueous solution, obtained in said fly ash concentrating step and containing an increased amount of the fly ash, at a temperature lower than 100° C. in the presence of a catalyst in a dissolved state, thereby decomposing the dioxins contained in the fly ash into a harmless substance.

10. A process for the wet processing of a flue gas generated from a combustion furnace and containing a dioxin-containing fly ash into a harmless substance, characterized in that said process comprises (i) a first gas-liquid contacting step of bringing said flue gas with a first treating liquid, (ii) a second gas-liquid contacting step of bringing the treated flue gas obtained in said first gas-liquid contacting step with a second treating liquid, and (iii) a dioxin decomposing step of contacting fly ash "A" captured by said first treating liquid in said first gas-liquid contacting step and fly ash "B" captured by said second treating liquid in said second gas-liquid contacting step, separately or jointly, into contact with an aqueous solution, acidified with hydrochloric acid and containing a catalyst dissolved therein, to decompose the dioxins contained in the fly ash into a harmless substance.

11. A process according to claim 10, wherein said second gas-liquid contacting step is performed in the presence of activated carbon.

* * * * *